(12) United States Patent
Zhang et al.

(10) Patent No.: US 10,452,233 B2
(45) Date of Patent: Oct. 22, 2019

(54) INFORMATION INTERACTIVE PLATFORM, SYSTEM AND METHOD

(71) Applicant: Shanghai Chule (CooTek) Information Technology Co., Ltd., Shanghai (CN)

(72) Inventors: Kan Zhang, Shanghai (CN); Hongjun Liu, Shanghai (CN); Xiaohui Li, Shanghai (CN); Chao Yuan, Shanghai (CN); Chong Wang, Shanghai (CN); Zhiqiang Zheng, Shanghai (CN)

(73) Assignee: SHANGHAI CHULE (COOTEK) INFORMATION TECHNOLOGY CO., LTD., Shanghai (CN)

( * ) Notice: Subject to any disclaimer, the term of this patent is extended or adjusted under 35 U.S.C. 154(b) by 325 days.

(21) Appl. No.: 15/409,399

(22) Filed: Jan. 18, 2017

(65) Prior Publication Data

US 2017/0228109 A1 Aug. 10, 2017

Related U.S. Application Data

(63) Continuation-in-part of application No. 14/804,017, filed on Jul. 20, 2015, which is a continuation of
(Continued)

(30) Foreign Application Priority Data

Jul. 18, 2014 (CN) .......................... 2014 1 0344894

(51) Int. Cl.
*G06F 3/0482* (2013.01)
*G06Q 30/00* (2012.01)
(Continued)

(52) U.S. Cl.
CPC ............ *G06F 3/0482* (2013.01); *G06F 3/167* (2013.01); *G06F 16/9535* (2019.01);
(Continued)

(58) Field of Classification Search
CPC .... G06F 3/0486; G06F 16/58; G06F 3/04883; G06F 3/0481; G06F 16/00; G06F 3/0482; H04N 21/482; H04L 51/00
See application file for complete search history.

(56) References Cited

U.S. PATENT DOCUMENTS 8,553,859 B1 10/2013 Lavian
9,423,925 B1 * 8/2016 Rajaraman .............. G06F 16/00
(Continued)

FOREIGN PATENT DOCUMENTS

CN 1681301 A 10/2005
CN 101483689 A 7/2009
(Continued)

OTHER PUBLICATIONS

International Search Report, dated Sep. 29, 2015, in PCT/CN2015/084540 (WO2016008453ISR).
(Continued)

*Primary Examiner* — Toan H Vu
(74) *Attorney, Agent, or Firm* — Flener IP & Business Law; Zareefa B. Flener

(57) ABSTRACT

System and method for information service platform interaction are disclosed. The method may include obtaining, through a user interface of a mobile device, an input sequence from a user. The method may also include determining at least one business object based on the input sequence. The input sequence may at least partially match an identifier of the at least one business object. The method may also include obtaining user data based on the at least one business object or based on user identification information. The method may further include determining a menu of an information service platform provided by the at least one business object based on the user data. The method may
(Continued)

further include displaying the menu according to a designated display mode on a display of the mobile device.

20 Claims, 25 Drawing Sheets

Related U.S. Application Data application No. PCT/CN2015/084540, filed on Jul. 20, 2015.

(51) Int. Cl.
    *G06F 3/16*     (2006.01)
    *G06Q 10/10*     (2012.01)
    *G06F 16/9535*     (2019.01)
    *G06F 16/957*     (2019.01)

(52) U.S. Cl.
    CPC ......... *G06F 16/9577* (2019.01); *G06Q 10/10* (2013.01); *G06Q 30/016* (2013.01)

(56) References Cited

U.S. PATENT DOCUMENTS

| | | | |
|---|---|---|---|
| 2002/0075330 A1* | 6/2002 | Rosenzweig | G06F 16/58 715/854 |
| 2009/0150814 A1 | 6/2009 | Eyer | |
| 2012/0063574 A1 | 3/2012 | Or-Bach | |
| 2012/0096377 A1* | 4/2012 | Lee | G06F 3/0486 715/769 |
| 2012/0254801 A1* | 10/2012 | Gaffney | G06F 3/0482 715/825 |
| 2013/0019201 A1* | 1/2013 | Cabrera-Cordon | G06F 3/04883 715/810 |
| 2013/0174199 A1* | 7/2013 | Dow | H04N 21/482 725/40 |
| 2013/0339874 A1* | 12/2013 | Yamaguchi | H04L 51/00 715/752 |
| 2014/0134979 A1 | 5/2014 | Sen | |
| 2015/0067531 A1* | 3/2015 | Adimatyam | G06F 3/0481 715/745 |
| 2015/0293943 A1* | 10/2015 | Kim | G06F 16/58 707/752 |
| 2017/0262164 A1* | 9/2017 | Jain | G06F 3/0482 |

FOREIGN PATENT DOCUMENTS

| | | |
|---|---|---|
| CN | 102184252 A | 9/2011 |
| CN | 102761671 A | 10/2012 |
| CN | 103002156 A | 3/2013 |
| CN | 103428377 A | 12/2013 |
| CN | 105162996 A | 12/2015 |
| WO | WO2012057461 A2 | 5/2012 |

OTHER PUBLICATIONS

Written Opinion of the International Search Authority, dated Sep. 21, 2015, in PCT/CN2015/084540.
Chinese Office Action for CN Application No. 2015104274166 dated Aug. 24, 2017.
Search Report for EP Application No. 158214908 dated May 8, 2018.

* cited by examiner

| Business Object | Index # | Status | Status Auxiliary Info | Service Menu |
|---|---|---|---|---|
| UPS | 8004561111 | Unbooked | Inquiring the price and time required fro shipping from xxx to yyy | New Order |
| | | | | Shipping Fee |
| | | | | Search Order |
| | | | | . . . |
| | | | | Delivery Range |

Fig. 12

| Business Object | Index # | Status | Status Auxiliary Info | Service Menu |
|---|---|---|---|---|
| Telecharge | 8004477400 | Ticketed | 2014-07-05 6:00 PM NYC Ambassador de Theatre Chicago Musical Front Row B109 | Buy Ticket |
| | | | | Ticket Info |
| | | | | Seat Upgrade |
| | | | | . . . |
| | | | | Change Ticket |

Fig. 13

Fig. 14
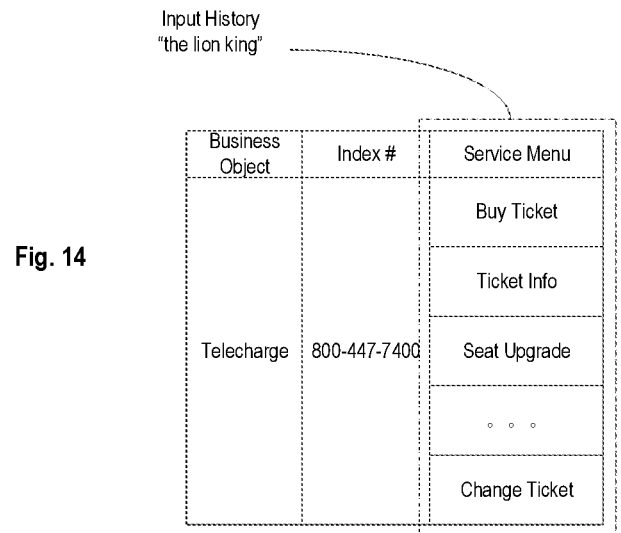
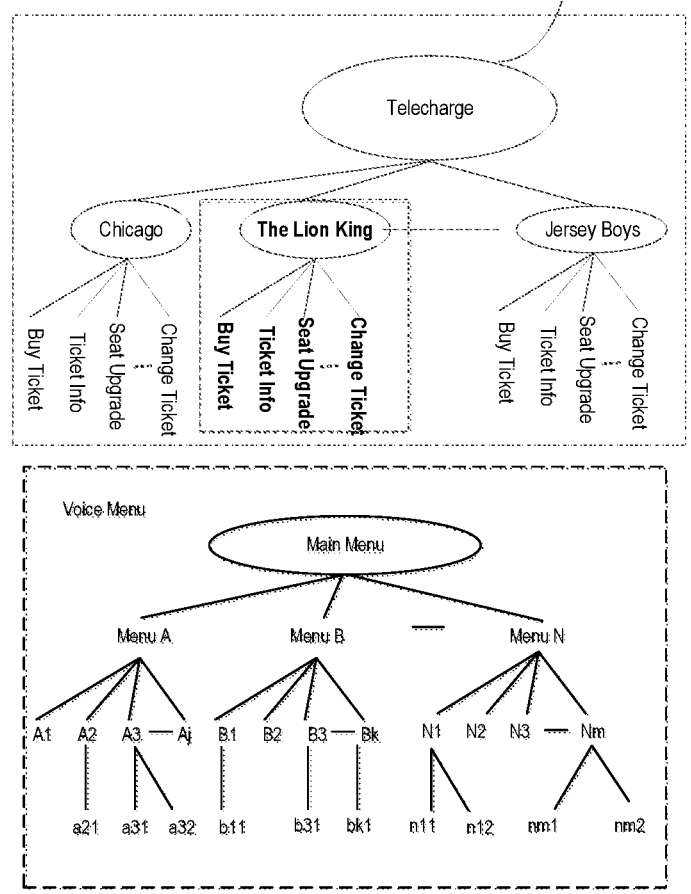
Fig. 15A

|  | Menu Item | Parent Node | Display Content | Priority | Related Node | Menu Content |
|---|---|---|---|---|---|---|
| Main Level | Menu A | X | ......... | 0 | ......... | ......... |
|  | Menu B | X | ......... | 0 | ......... | ......... |
|  | Menu N | X | ......... | -1 | ......... | ......... |
| Second Level | SubMenu A1 | X->A | ......... | +1 | ......... | ......... |
|  | SubMenu A2 | X->A | ......... | 0 | ......... | ......... |
|  | Submenu A3 | X->A | ......... | 0 | ......... | ......... |
|  | ......... | X->A | ......... | 0 | ......... | ......... |
|  | Submenu Aj | X->A | ......... | 0 | ......... | ......... |
|  | Submenu B1 | X->B | ......... | 0 | ......... | ......... |
|  | Submenu B2 | X->B | ......... | 0 | ......... | ......... |
|  | Submenu B3 | X->B | ......... | +1 | ......... | ......... |
|  | ......... | X->B | ......... | 0 | ......... | ......... |
|  | Submenu Bk | X->B | ......... | -1 | ......... | ......... |
|  | Submenu N1 | X->N | ......... | 0 | ......... | ......... |
|  | Submenu N2 | X->N | ......... | 0 | ......... | ......... |
|  | Submenu N3 | X->N | ......... | 0 | ......... | ......... |
|  | ......... | X->N | ......... | 0 | ......... | ......... |
|  | Submenu Nm | X->N | ......... | 0 | ......... | ......... |
| Third Level | Submenu a21 | X->A->A2 | ......... | 0 | ......... | ......... |
|  | Submenu a31 | X->A->A3 | ......... | 0 | ......... | ......... |
|  | Submenu a32 | X->A->A3 | ......... | 0 | ......... | ......... |
|  | Submenu b11 | X->A->B1 | ......... | 0 | ......... | ......... |
|  | Submenu b31 | X->A->B3 | ......... | +1 | ......... | ......... |
|  | Submenu bk1 | X->A->Bk | ......... | 0 | ......... | ......... |
|  | Submenu n11 | X->A->N1 | ......... | 0 | ......... | ......... |
|  | Submenu n12 | X->A->N1 | ......... | 0 | ......... | ......... |
|  | Submenu nm1 | X->A->Nm | ......... | 0 | ......... | ......... |
|  | Submenu nm2 | X->A->Nm | ......... | 0 | ......... | ......... |
|  | Submenu nm3 | X->A->Nm | ......... | 0 | ......... | ......... |

Fig. 15B

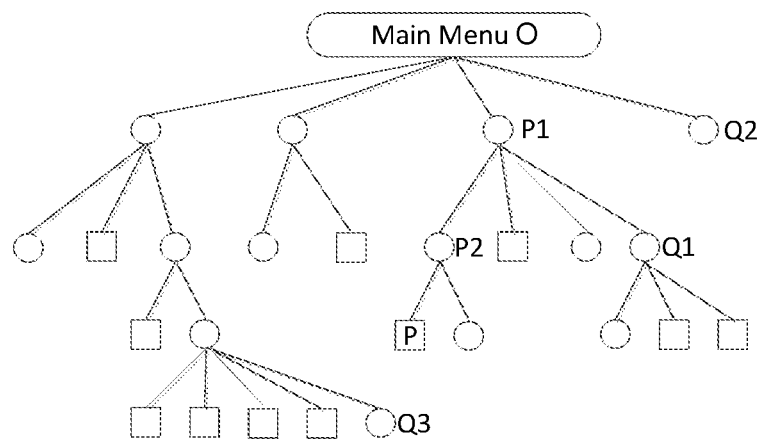

Fig. 15C

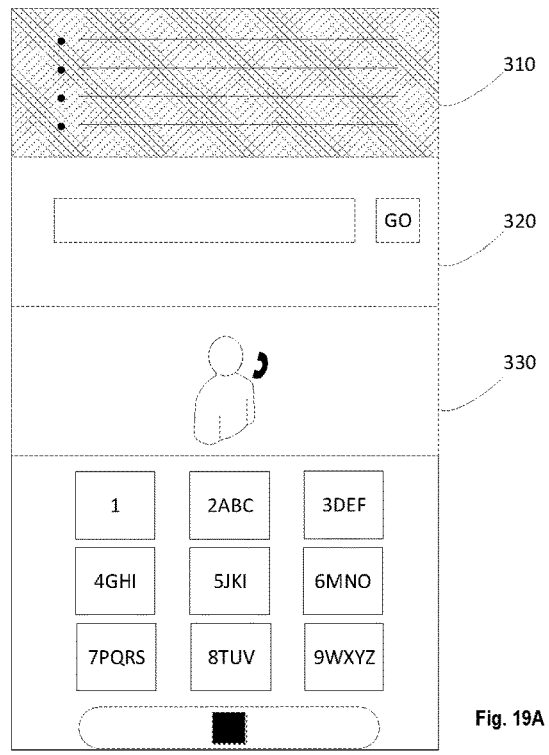

Fig. 19A

| Menu Item | Parent Note | Display Content | Priority | Related Note | Menu Content | Menu Type |
|---|---|---|---|---|---|---|
| Menu A | X | --------- | 0 | --------- | --------- | Inquiry |
| Menu B | X | --------- | 0 | --------- | --------- | Information |
| Menu N | X | --------- | -1 | --------- | --------- | Information |
| Submenu A1 | X->A | --------- | +1 | --------- | --------- | Inquiry |
| Submenu A2 | X->A | --------- | 0 | --------- | --------- | Inquiry |
| Submenu A3 | X->A | --------- | 0 | --------- | --------- | Information |
| --------- | X->A | --------- | 0 | --------- | --------- | --------- |
| Submenu Aj | X->A | --------- | 0 | --------- | --------- | Inquiry |
| Submenu B1 | X->B | --------- | 0 | --------- | --------- | Information |
| Submenu B2 | X->B | --------- | 0 | --------- | --------- | Information |
| Submenu B3 | X->B | --------- | +1 | --------- | --------- | Inquiry |
| --------- | X->B | --------- | 0 | --------- | --------- | --------- |
| Submenu Bk | X->B | --------- | -1 | --------- | --------- | Information |
| Submenu N1 | X->n | --------- | 0 | --------- | --------- | Inquiry |
| Submenu N2 | X->n | --------- | 0 | --------- | --------- | Information |
| Submenu N3 | X->n | --------- | 0 | --------- | --------- | Agent |
| --------- | X->n | --------- | 0 | --------- | --------- | --------- |
| Submenu Nm | X->n | --------- | 0 | --------- | --------- | Information |
| Submenu a21 | X->A->A2 | --------- | 0 | --------- | --------- | Inquiry |
| Submenu a31 | X->A->A3 | --------- | 0 | --------- | --------- | Inquiry |
| Submenu a32 | X->A->A3 | --------- | 0 | --------- | --------- | Inquiry |
| Submenu b11 | X->B->B1 | --------- | 0 | --------- | --------- | Information |
| Submenu b31 | X->B->B3 | --------- | +1 | --------- | --------- | Inquiry |
| Submenu bk1 | X->B->Bk | --------- | 0 | --------- | --------- | Information |
| Submenu n11 | X->n->n1 | --------- | 0 | --------- | --------- | Inquiry |
| Submenu n12 | X->n->n1 | --------- | 0 | --------- | --------- | Information |
| Submenu nm1 | X->n->nm | --------- | 0 | --------- | --------- | Information |
| Submenu nm2 | X->n->nm | --------- | 0 | --------- | --------- | Inquiry |
| Submenu nm3 | X->n->nm | --------- | 0 | --------- | --------- | Agent |

Fig. 19B

| Menu Item | Parent Note | Display Content | Priority | Related Note | Menu Content | Menu Type |
|---|---|---|---|---|---|---|
| Menu N | X | ------------- | -1 | ------------- | ------------- | Information |
| Submenu A3 | X->A | ------------- | 0 | ------------- | ------------- | Information |
| Submenu B1 | X->B | ------------- | 0 | ------------- | ------------- | Information |
| Submenu B2 | X->B | ------------- | 0 | ------------- | ------------- | Information |
| Submenu Bk | X->B | ------------- | -1 | ------------- | ------------- | Information |
| Submenu N1 | X->n | ------------- | 0 | ------------- | ------------- | Information |
| Submenu Nm | X->n | ------------- | 0 | ------------- | ------------- | Information |
| Submenu b11 | X->B->B1 | ------------- | 0 | ------------- | ------------- | Information |
| Submenu bk1 | X->B->Bk | ------------- | 0 | ------------- | ------------- | Information |
| Submenu n12 | X->n->n1 | ------------- | 0 | ------------- | ------------- | Information |
| Submenu nm1 | X->n->nm | ------------- | 0 | ------------- | ------------- | Ifomation |

Fig. 19C

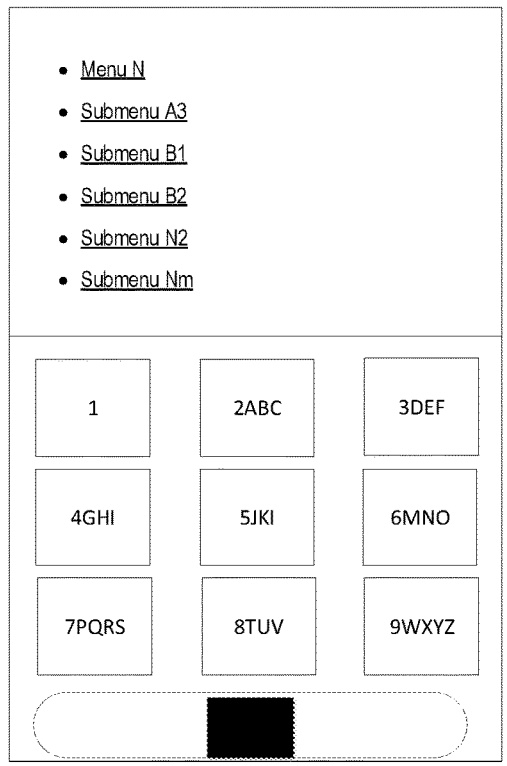

Fig. 19D

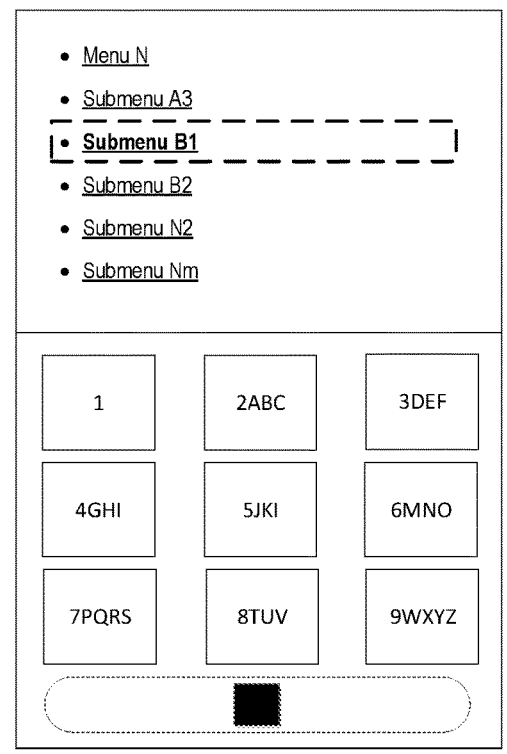

Fig. 19E

| Menu Item | Parent Note | Display Content | Priority | Related Node | Menu Content | Menu Type |
|---|---|---|---|---|---|---|
| Submenu b11 | X->B->B1 | ------------- | 0 | ------------- | ------------- | Information |

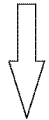

| Menu Content | ---------------------------------------- (Link A) |
|---|---|

Fig. 19I

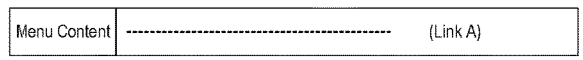

| Menu Item | Parent Note | Display Content | Priority | Related Node | Menu Content | Menu Type |
|---|---|---|---|---|---|---|
| Menu A | X | ............ | 0 | ............ | ............ | Inquiry |
| Submenu A1 | X->A | ............ | +1 | ............ | ............ | Inquiry |
| Submenu A2 | X->A | ............ | 0 | ............ | ............ | Inquiry |
| Submenu Aj | X->A | ............ | 0 | ............ | ............ | Inquiry |
| Submenu B3 | X->B | ............ | +1 | ............ | ............ | Inquiry |
| Submenu N1 | X->n | ............ | 0 | ............ | ............ | Inquiry |
| Submenu a21 | X->A->A2 | ............ | 0 | ............ | ............ | Inquiry |
| Submenu a31 | X->A->A3 | ............ | 0 | ............ | ............ | Inquiry |
| Submenu a32 | X->A->A3 | ............ | 0 | ............ | ............ | Inquiry |
| Submenu b31 | X->B->B1 | ............ | +1 | ............ | ............ | Inquiry |
| Submenu n11 | X->n->n1 | ............ | 0 | ............ | ............ | Inquiry |
| Submenu nm1 | X->n->nm | ............ | 0 | ............ | ............ | Inquiry |

Fig. 20B

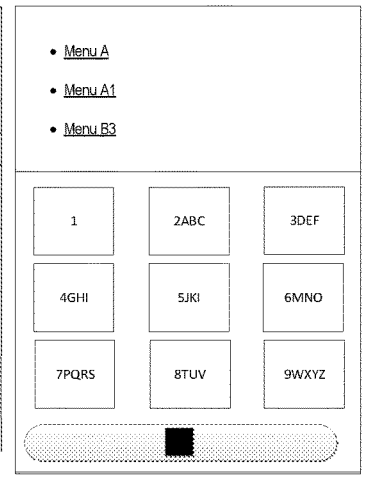

Fig. 20C

INFORMATION INTERACTIVE PLATFORM, SYSTEM AND METHOD

CROSS REFERENCE TO RELATED APPLICATION

The present application is a continuation of International Patent Application No. PCT/CN2015/084540 filed on Jul. 20, 2015, which claims priority of Chinese Patent Application No. 201410344894.6 filed on Jul. 18, 2014, and is also a continuation-in-part of U.S. patent application Ser. No. 14/804,017 filed on Jul. 20, 2015, which claims priority of Chinese patent application No. 201410344894.6 filed on Jul. 18, 2014.

TECHNICAL FIELD

This disclosure relates generally to electronic device application and related services. More specifically, it relates to information interaction methods in a smart service platform, the smart service platform, and systems and apparatuses involved in the smart service platform.

BACKGROUND

Voice-based customer service is common in today's commercial practice. In a typical voice-based customer service process, a customer dials a customer service number provided by a merchant. The customer is normally greeted by pre-recorded voice instructions and provided with a selection of services by means of a voice menu. This form of customer service, however, has many problems. First, in order for the merchant to provide more comprehensive services, the voice menu usually includes many options or includes long explanations. Since the customer can only receive the relevant menu information in the form of voices and the customer normally cannot remember too much information, what happened frequently is that the customer has to replay the current voice menu in order to recall the menu items that have just been heard, thus increasing the complexity of the operation and easily making the subscriber feel uncomfortable. Second, the order or arrangement of these menu items are designed by the merchant unilaterally, and the arrangement of these menu item are usually fixed and would not adapted to different customers. Therefore, it is possible that the menu item corresponding to the service requested by the customer is arranged as the last item of all the menu items provided by the merchant. Because the customer usually does not know the arrangement of the menu items until he/she finishes listening to the whole menu, the customer has to spend a long time to listen to other menu items or voice descriptions that are unnecessary and redundant. Moreover, due to the inflexible design of the voice menu, when a menu item corresponding to the service requested by the customer is buried deep in layers of selections, the customer has to repeat the same lengthy operation in order to reach the requested menu item every time he/she dials a voice service number, even when the customer has already dialed such service number many times before and the customer requests the same service every time he/she dials such service number.

In view of above shortcomings, it's desirable to provide a more convenient and more efficient solution for facilitating the interaction and communication between the customer and the merchant.

SUMMARY

One aspect of the present disclosure relates to a computer-implemented information service platform interaction method. The method may include obtaining, through a user interface of a mobile device, an input sequence from a user. The method may also include determining, by a processor device, at least one business object based on the input sequence. The method may also include determining, by the processor device, a menu of an information service platform provided by the at least one business object based on user data. The method may further include displaying the menu associated with the user data on a display of the mobile device.

Another aspect of the present disclosure relates to an information interactive platform device, including: input module, used to receive an input from a user and the input is associated with at least a business object, wherein said business object may include information interactive platform; a pre-processing module, used to obtain user data; a transport interface module, used to transport user data obtained from pre-processing module and as well as menu items corresponding to user data from pre-processing module and matched with input data from input module; output module, used to display said menu items obtained from transport interface module.

Another aspect of the present disclosure relates to an information interactive platform device, including: received module, used to receive input information and user data; memory/storage module, used to store business objects and the corresponding information interactive platform thereof, wherein said business object may include one or more data fields for inquiring according to input information; inquire module, used to search in said menu items of memory/storage module and obtain a menu item matched with said input information and corresponding to said user data; send module, used to send the menu item from inquire module.

Another aspect of the present disclosure relates to an information service platform interaction system, including an input device, a processor device operatively coupled to a memory device. The processor device may be configured to execute instructions stored in the memory device to perform operations. The operations may include obtaining, through a user interface of a mobile device, an input sequence from a user. The operations may also include determining at least one business object based on the input sequence. The input sequence may at least partially match an identifier of the at least one business object. The operations may also include obtaining user data based on the at least one business object or based on user identification information. The operations may further include determining a menu of an information service platform provided by the at least one business object based on the user data. The operations may further include displaying the menu according to a designated display mode on a display of the mobile device.

Compare to the prior arts, the present disclosure makes full use of user data to filter platform menu items of a matched business object and provider a more accurate menu item to the user, while setting up an intelligent information interactive platform between users and business objects. Furthermore, the present disclosure displays the intelligent information interactive platform in a set display mode, according to user data. The present disclosure fully considers the personal characters of different users and sets up an intelligent information interactive platform, between users and business objects, specially suitable for the user, so as to offer the user service information or provide a service from the business object through the platform, and thus make the communication between users and business objects more convenient and efficient.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

FIG. 12 shows an exemplary service menu selection process based on interaction history information, according to some embodiments of the present disclosure.

FIG. 13 shows another exemplary service menu selection process based on interaction history information, according to some embodiments of the present disclosure.

FIG. 14 shows an exemplary service menu selection processor based on input history, according to some embodiments of the present disclosure.

FIG. 15A shows an exemplary voice menu structure, according to some embodiments of the present disclosure.

FIG. 15B shows an exemplary table storing the text information extracted from the voice content, according to some embodiments of the present disclosure.

FIG. 15C shows an exemplary tree-type structure, according to some embodiments of the present disclosure.

FIGS. 19A-19J show an exemplary process of displaying an information consultation related menu, according to some embodiments of the present disclosure.

FIGS. 20A-20F show an exemplary process of displaying information based on an input to an inquiry menu, according to some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It is also noted that as used herein and in the appended claims, the singular forms "a," "an," and "the" include plural references unless the context clearly dictates otherwise.

Figure 1A:
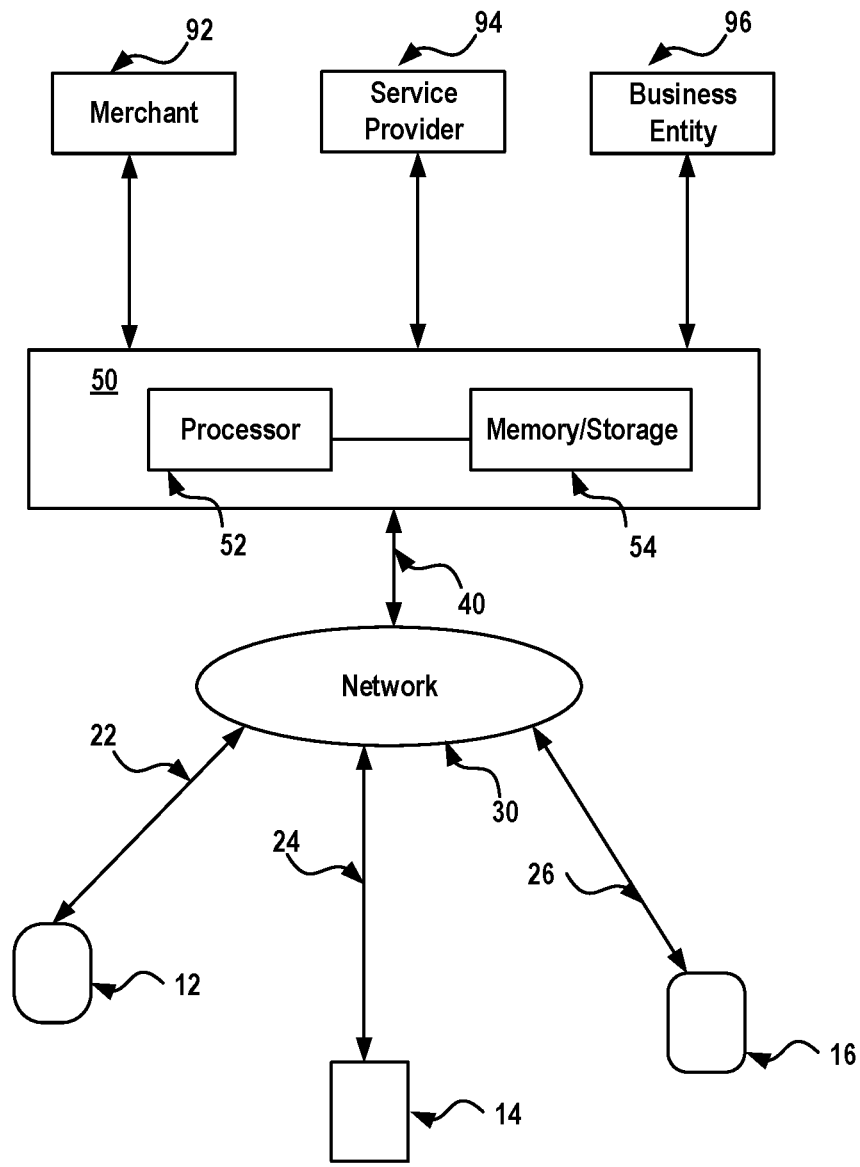
FIG. 1A is a schematic diagram of an exemplary smart service system, according to some embodiments of the present disclosure.

FIG. 1A is a schematic diagram of an exemplary information interactive platform system 10, according to some embodiments of the present disclosure. As used herein, information interactive platform system 10 may also be referred to a smart service system 10, intelligent service system 10, intelligent/smart service interactive system 10, or simply system 10. System 10 may include one or more electronic devices, such as electronic devices 12, 14, and 16. Electronic devices 12, 14, and 16 may include mobile telephones, smartphones, tablet computers, personal digital assistants (PDAs), or any other communication electronic devices equipped with a display device. Electronic devices 12, 14, and 16 may also include cameras, wearable electronic devices such as smart watches, laptops/notebook computers, netbook computers, mobile reading devices such as e-book readers, navigation devices such as GPS devices, electronic interactive terminal located at a public place such as a bus/train/metro station or a school, or other electronic devices having a display device.

As shown in FIG. 1A, electronic devices 12, 14, and 16 may communicate with a network 30 via communication channels 22, 24, and 26, respectively. Network 30 may include telecommunication networks such as GPRS, 2G, 3G, 4G, and LTE networks; wireless networks such as WLAN/WiFi, Bluetooth, and satellite networks; broadband networks such as ADSL, VDSL, optical fiber, cable television, and modem-dial networks; the Internet; or other suitable networks capable of communicatively connecting one or more electronic devices (e.g., 12, 14, and/or 16) to a server 50. For example, in one embodiment, electronic device 12 may be a smartphone and communication channel 22 may be a telecommunication data link (e.g., GPRS, CDMA, 2G, 3G, 4G, LTE, etc.). In another embodiment, communication channel 22 may include a WLAN/WiFi link to a local wireless network (not shown), which in turn connects to network 30 through, for example, a broadband Internet connection such as a cable, fiber, WiMAX, or satellite network. In some embodiments, electronic device 14 may be a tablet. In some embodiments, electronic device 16 may be a laptop/notebook computer.

Server 50 may include one or more computer systems configured to receive requests from electronic devices 12, 14, and/or 16 and respond to the requests. Server 50 may connect to network 30 through a communication channel 40. Communication channel 40 may include broadband data links capable of providing high data throughputs. It is noted that although only one server and one communication channel is shown in FIG. 1A, a person of ordinary skill in the art would understand that server 50 may include multiple apparatuses, computer systems, or infrastructure components that are physically located in a centralized or distributed manner, and communication channel 40 may include different types of connection technologies commensurate with the apparatuses, computer systems, or infrastructure components connected thereto.

Server 50 may include one or more processors, such as processor 52. Processor 52 may include one or more central processing units (CPUs), integrated circuits (ICs), printed circuit boards (PCBs), or other computing devices. Processor 52 can execute computer program instructions to perform various operations and/or tasks.

Server 50 may include one or more data storing devices, such as memory/storage 54. Memory/storage 54 may include a random access memory ("RAM"), a read-only memory ("ROM"), a flash drive, a solid-state drive (SSD), a hard drive, an array of high volume storage devices, or other suitable temporary or permanent data storing devices.

In some embodiments, electronic device 12 may request data or services from server 50. For example, electronic device 12 may send a request message to server 50 through communication channel 22, network 30, and communication channel 40. Server 50, upon receiving the request message, may respond to the request message by sending a response to electronic device 12. The response may include the requested data or services, or location information of the requested data or services, or other suitable information relating to the request message.

Server 50 may communicate with a plurality of business objects, such as merchant 92, service provider 94, and business entity 96. Merchant 92 may provide products or goods for sale, or services, either through traditional brick and mortar channel or through online shopping/service channel. Service provider 94 may provide various services to customers, such as shipping, banking, etc. Business entity 96 may include general business presence, either with or without an official business license (e.g., business entity 96 may include small businesses, home businesses, or sole proprietorship businesses). All these business types are collectively referred herein as business objects. Information about these business objects, such as products for sale, services, and other business information, may be accessed by server 50. In some embodiments, the information may be processed, analyzed, and/or formatted by server 50 and provided to electronic devices 12, 14, and/or 16. For example, electronic device 12 may download a software application from server 50, which serves as an information gateway to server 50. Using the software application, electronic device 12 may access to information stored on or otherwise available to server 50, which is in turn relevant to business objects 92, 94, and/or 96. In another example, electronic device 14 may access server 50 through a standard software application, such as a browser, to access information provided by server 50. In another example, the function of communicating with server 50 may be integrated into the system level software of electronic device 16 such that electronic device 16 may access to information of server 50 without installing any additional software application.

Embodiments consistent with the present disclosure involve a smart service platform (also referred to as smart platform, intelligent service platform, intelligent service interactive platform, or simply platform) that provides information and/or services relating to one or more business objects to a user. In one embodiment, the smart service platform may be implemented on server 50. For example, server 50 may provide a web service accessible by electronic device 12/14/16 using a browser application. In another embodiment, the smart service platform may be implemented on electronic device 12/14/16. For example, the smart service platform may be in the form of a mobile application that is downloaded from server 50. The mobile application may include necessary coding, interface, and/or data package to provide information and/or services to the user of electronic device 12/14/16. In another embodiment, the smart service platform may be implemented by combining the functionalities of server 50 and electronic device 12/14/16. For example, the smart service platform may include a user interface in the form of a mobile application installed on electronic device 12/14/16. The mobile application may communicate with server 50 to send/receive information relating to one or more business objects (e.g., 92, 94, and/or 96) upon user's request, on a periodic basis, or on other suitable schedules.

In some embodiments, the smart service platform may be configured to provide access to information of one or more business objects. For example, a user may input data using an electronic device (e.g., 12, 14, or 16). Based on the input data and optionally on user related information, the smart service platform may establish an interactive service interface between the user and one or more business objects having an identifier that matches or at least partially matches the input data. Using the interactive service interface (e.g., provided on the electronic device 12, 14, or 16 and optionally having communication link to server 50), the user can obtain information of the matched business object(s) or access the service provided by the matched business object(s).

As used herein, user related information (also referred to "user identification information," "user related data," or "user data") may include personal information of the user such as age, gender, preference and the like of the user, the current input of the user, the input history of the user, the current position of the user, the interactive history between the user and the matched business object, the account information and so on. Furthermore, user related information may also include the device information related to the electronic device the user uses to access the interactive service interface, such as system language, display configuration and so on.

Figure 1B:
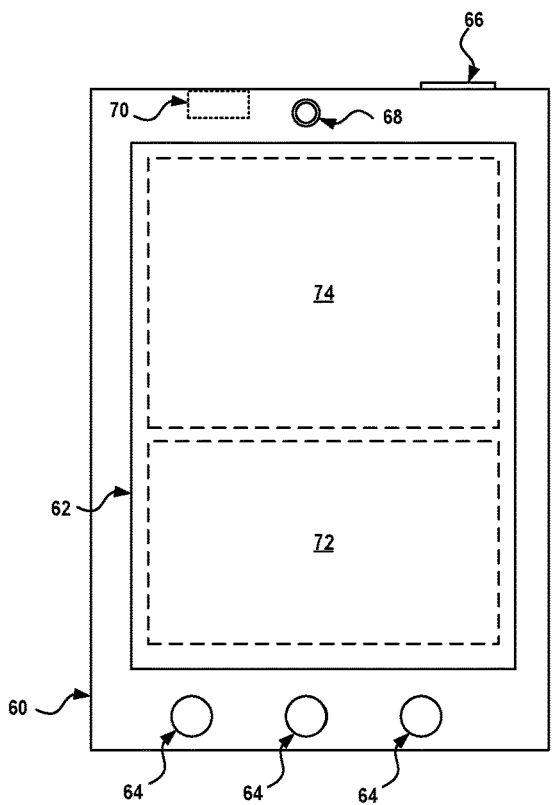
FIG. 1B is a schematic diagram of an exemplary electronic device, according to some embodiments of the present disclosure.

FIG. 1B is a schematic diagram of an exemplary electronic device 60, according to some embodiments of the present disclosure. Electronic device 60 shown in FIG. 1B may be an exemplary implementation of any one of mobile devices 12, 14, and 16 shown in FIG. 1A. As shown in FIG. 1B, electronic device 60 may include a display 62. Display 62 may include a LCD display panel, an OLED display panel, or other suitable display devices. Display 62 may be touch sensitive so that a user may input information by touch one or more areas of display 62. Display 62 may display video, image, and/or text information. For example, display 62 may display an information input region 72 (e.g., a soft keypad) and an information content region 74 (e.g., displaying information and/or receiving touch input).

As shown in FIG. 1B, electronic device 62 may include one or more buttons 64. In one embodiment, buttons 64 may be hard buttons (e.g., including physical socket and cover). In another embodiment, buttons 64 may be soft buttons displayed on display 62. In some embodiments, buttons 64 may include both hard and soft buttons. Buttons 64 may be used by a user to select, deselect, and/or navigate content displayed on display 62.

Electronic device 60 may include one or more cameras 68. Camera 68 may be located on the front and/or back face of electronic device 60. Electronic device 60 may include a power switch 66. Power switch 66 may be located on the front face, back face, or along the edges of electronic device 60. Electronic device 60 may include a wireless communication module 70. Communication module 70 may include hardware devices such as one or more antennas, modulators, encoders, decoders, etc., as well as software to communicatively connect electronic device 70 to network 30 via, for example, WLAN/WiFi, 2G, GPRS, CDMA, 3G, 4G, LTE, Bluetooth, etc.

Figure 1C:
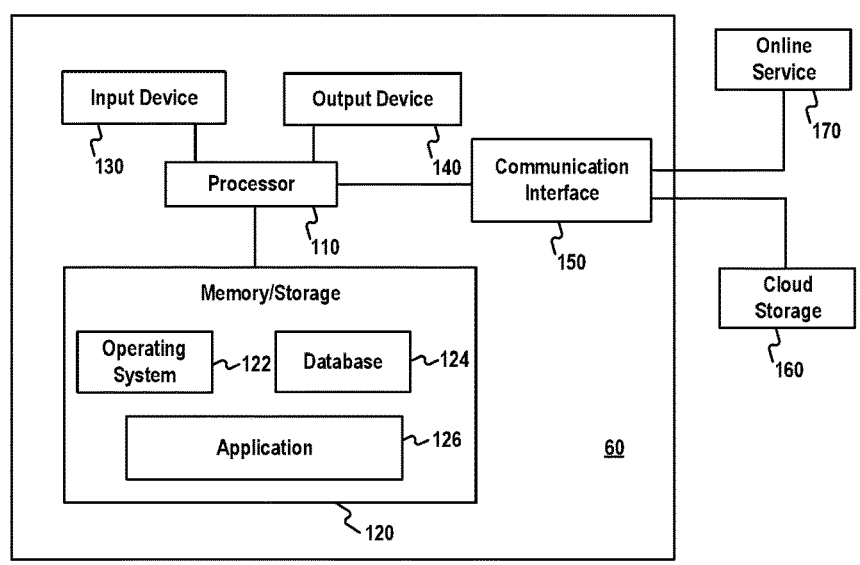
FIG. 1C is a block diagram of the exemplary electronic device shown in FIG. 1B.

FIG. 1C is a block diagram of the exemplary electronic device 60 shown in FIG. 1B. Consistent with some embodiments, electronic device 60 may include a processor device 110, a memory/storage device 120, an input device 130, an output device 140, and a communication interface 150. Processor device 110 may be a central processing unit ("CPU"), a graphic processor unit ("GPU"), or a mobile processor. Depending on the type of hardware being used, processor device 110 can include one or more integrated circuits (ICs), printed circuit boards (PCBs), and/or microprocessor chips. Processor device 110 can execute computer program instructions to perform various methods, operations, and/or tasks that will be explained in greater detail below. In some embodiments, processing device 110 can be configured to search in the memory/storage device 120 according to input data received via the input device 130 and the user related data, so as to access the business object matching, at least partially, the input data.

Memory/storage device 120 may include, for example, one or more random access memories (RAMs), read only memories (ROMs), flash memories, solid-state drives (SSDs), or other suitable temporary or permanent data storing devices. In some embodiments, computer program instructions can be stored, accessed, and read from the ROM, flash memory, SSD, or any other suitable memory location, and loaded into the RAM for execution by processor device 110. For example, memory/storage module 120 may store an operating system 122, one or more software applications 126, and a database 124. Operating system 122 may be suitable for general computer systems or for software-controlled devices. Memory/storage device 120 may store the entire software application 126 or store only a portion of software application 126. For example, memory/storage device 120 can store intelligent service interactive software which can be executed by processor device 110 to perform an intelligent service interactive method.

In some embodiments, software application 126 or portions of it may be stored on a computer readable medium, such as a hard drive, optical disk, flash drive, SD card, memory stick, or any other suitable medium, and can be read and acted upon by processor 110 using routines that have been loaded to memory/storage device 120.

In some embodiments, memory/storage device 120 may also store main data, user/subscriber data, application data, and one or more types of program codes. For example, memory/storage device 120 may include a local database 124. In some embodiments, at least part of the data may be stored on a cloud storage location 160. In some embodiments, memory/storage device 120 and/or cloud storage location 160 may store information of one or more business objects. The business object information may include one or more data fields, which store relevant information for describing the business object, such the business name, the business keywords, the business phone number, whether or not the business object would provide the service for intelligent service interactive platform, its corresponding service for intelligent service interactive platform, the service menu, menu item, and the interaction record, the user/customer/subscriber account and so on.

In some embodiments, input device 130 and output device 140 may be coupled to processor 110 through appropriate interfacing circuitry. In some embodiments, input device 130 may include a hardware keyboard, a keypad, a touch screen, etc., through which a user may input information to electronic device 60. Input device 130 may also include camera 68 and buttons 64 shown in FIG. 1B. In some embodiments, input device 130 may include a plurality of physical keys or virtual keys, each of which corresponds to one digit and/or one or more letters. A user can press or touch the key of input device 130 to input information into the intelligent service interactive platform. In some embodiments, input device 130 can also include an inductive input device. For example, input device 130 may include a voice input device and/or a voice recognition device. A user may perform voice input via the voice input device, and the voice recognition device may recognize the content of the voice and convert the voice into text information corresponding to the input voice. The recognition result can also include standardized voice information corresponding to the input voice. In some embodiments, input device 130 may also include a graphic recognition device, which obtains input signals by detecting graphs or images input by the user, such as bar codes, strokes, or graphs drawn by the user, and recognizing such graphs or images. In some embodiments, input device 130 may also include one or more motion detection devices for detecting the user's body movements made in specific area or actions having assigned meanings. In some embodiments, input device 130 may also include some functional keys, and the user can initiate a process to be performed by the intelligent service interactive platform via these functional keys. The user may also interact with the intelligent service interactive platform in other suitable ways.

Output device 140 may include one or more display screens, such as display 62, for displaying text, image, motion picture, or other information. For example, output device 140 may display a graphic user interface (GUI).

Communication interface 150 may provide communication connections such that electronic device 60 may exchange data with external devices. For example, electronic device 60 may be connected to network 30 through communication interface 150. Communication interface 150 may include, for example, communication module 70 shown in FIG. 1B. According to an embodiment, communication interface 150 may be configured to communicate with an online service 170. According to some embodiments, online service 170 may be implemented as a web service, a cloud storage service (e.g., cloud storage 160), or the like.

Figure 2:
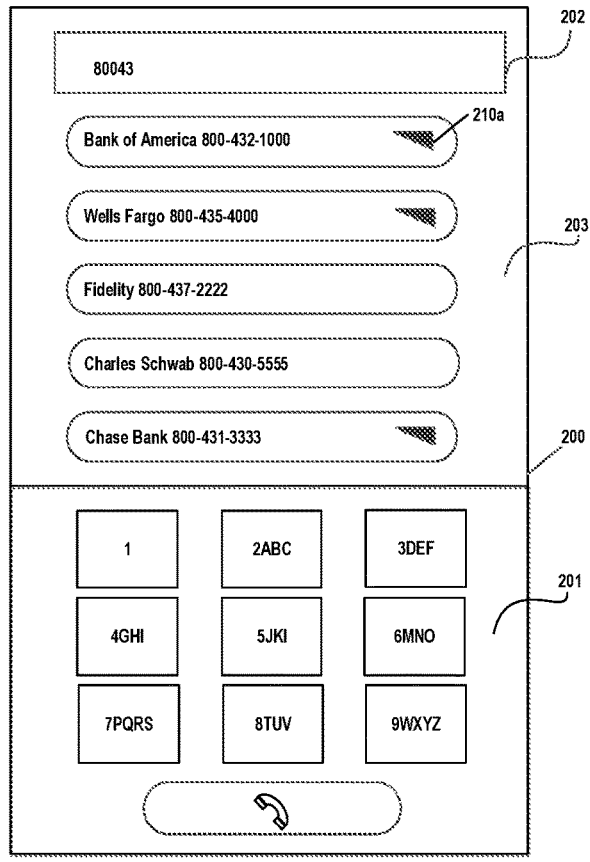
FIGS. 2-4 show exemplary dial interfaces, according to some embodiments of the present disclosure.

FIG. 2 shows an exemplary dial interface 200 of an exemplary intelligent service interactive platform. Dial interface 200 can be displayed on display device 62 of electronic device 60. As shown in FIG. 2, dial interface 200 may include a dialing area 201, an input box 202, and a business object information displaying area 203.

Figure 3:
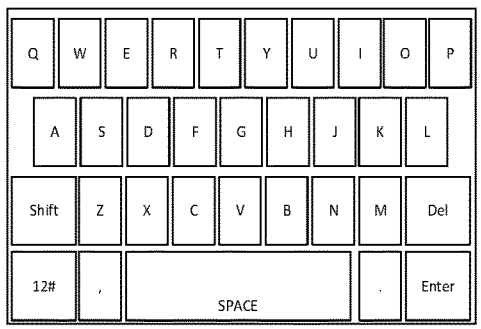
Figure 4:
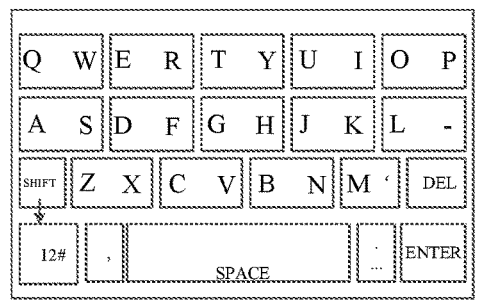

A user can perform input operations via dialing area 201, and the input content can be displayed in input box 202 as the user is inputting. For example, dialing area 201 may be triggered when dialing area 201 switches from a hidden state to a pop-up state, and the platform may acquire the input content by detecting the touch or press on the keys in dialing area 201. In one embodiment, dialing area 201 may include a plurality of physical keys or virtual keys, as shown in FIG. 2. Each key may correspond to a digit, a symbol, and/or a letter. In another embodiment, dialing area 201 may also employ a keyboard with a full-size keyboard layout as shown in FIG. 3 or a reduced keyboard as shown in FIG. 4.

During an input process, the user may sequentially press individual keys in dialing area 201, and the pressed keys (e.g., digits, symbols, and/or letters) may form an input content. For example, when the user wants to enter Red Top Cab to book a taxi service, according to its reservation system telephone number of (703) 333-3333, the user can sequentially click/press the following digital keys on dialing area 201: "PQRS(7)", "0", "DEF (3)", "DEF (3)", "DEF (3)", "DEF (3)", "DEF (3)", "DEF (3)", "DEF (3)", "DEF (3)". In another example, the user may instead input the name of the taxi service or abbreviation thereof. In this case, the user can sequentially click/press the following keys of dialing area 201: "PARS (7)", "DEF (3)", "DEF (3)", "TUV (8)", "MNO (6)", "PARS (7)".

According to some embodiments, processor device 110 may obtain the content input by the user, match it with the data field associated with the business object stored in memory/storage device 120, and acquire information of the matched business object. For example, processor device 110 may acquire the keystrokes input by the user in dialing area 201, and may analyze the acquired keystrokes according to the letters and/or digits corresponding to the respective keystrokes in order to obtain an input sequence corresponding to those keystrokes input by the user. The input sequence may be textual contents or a digit string. For example, keystrokes of "PQRS(7)", "0", "DEF (3)", "DEF (3)", "DEF (3)", "DEF (3)", "DEF (3)", "DEF (3)", "DEF (3)", "DEF (3)" may be analyzed to obtain a digit string of 7033333333. In another example, keystrokes of "PQRS(7)", "DEF (3)", "DEF (3)", "TUV (8)", "MNO (6)", "PQRS (7)" may be analyzed to obtain a textual content of "redtop." Processor device 110 may further match the obtained input sequence with information stored in memory/storage device 120, for example match the input sequence with the telephone number, name or name abbreviation of the business object, so as to obtain a matched business object. In some embodiments, when multiple business objects match the input sequence, processor device 110 may obtain multiple business objects. For example, when the input sequence is a partial telephone number (e.g., 70333), multiple business objects may share that partial number. In another example, multiple business objects may include a common name or name abbreviation (e.g., redtop taxi, redtop inn, redtop hotel, etc.). In some embodiments, the matching process may be performed simultaneously with or on-the-fly as the user is inputting information.

In one embodiment, upon obtaining one or more matched business objects, processor device 110 may display the matched business object(s) in displaying area 203. Processor device 110 may detect whether the displayed business object(s) can provide intelligent platform service. A business object can provide intelligent platform service when, for example, the business object can provide a service menu accessible from interface 200. Once detected, processor device 110 may display the business object(s) that can provide intelligent platform service using predetermined display mode, such as using a different color form the other business object(s)(not shown). In another example, a marking may be displayed on the business object that can provide intelligent platform service. FIG. 2 shows an exemplary marking 210*a*. In some embodiments, the matched business object(s) may not be displayed to the user.

Input device 130 may further detect user selection action and determine whether to launch the intelligent service provided by a business object when it is detected that the business object is selected.

In some embodiments, selection of a matched business object may be achieved by clicking or pressing the business object, staying on the business object for a predetermined time period, using voice commands, or using gesture commends. In some embodiments, after a user inputs a partial or complete input sequence, processor device 110 may automatically select one or more business objects matching the partial or complete input sequence as the matched business object(s), regardless of whether the matched business object(s) is displayed or not.

Figure 5:
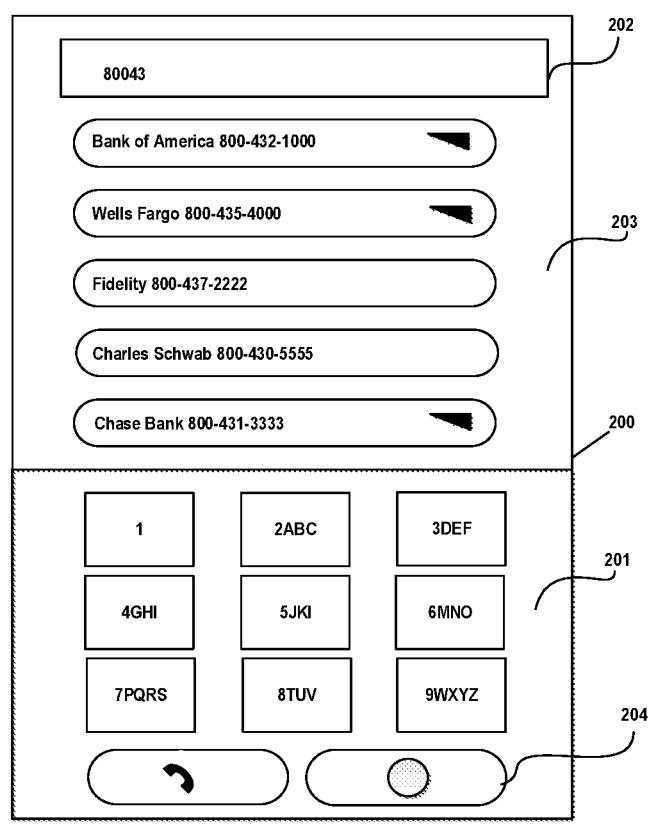
FIGS. 5-6 show exemplary interfaces with a platform service start button, according to some embodiments of the present disclosure.
Figure 6:
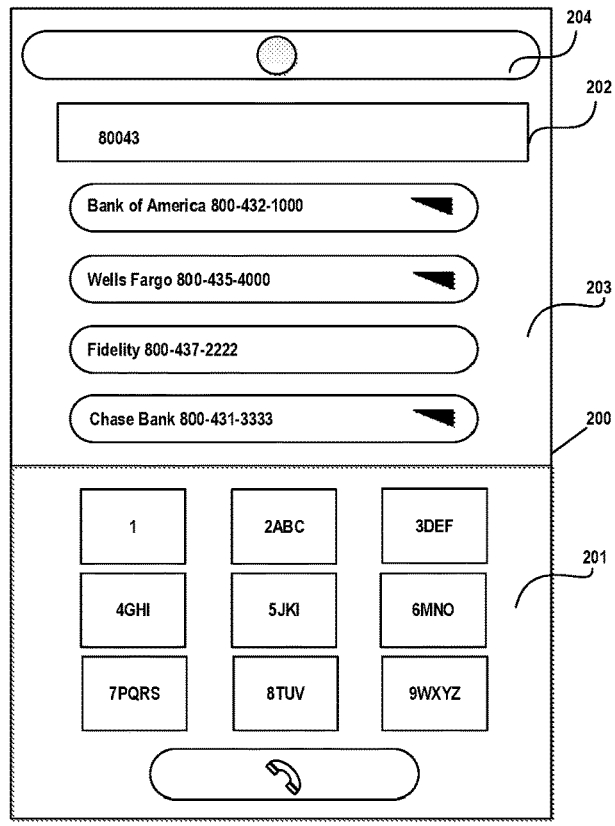

In one embodiment, with reference to FIG. 5, interface 200 may further include a platform service start button 204, and the operation of the platform service start button 204 may be enabled by touching or pressing it or by other operations, thus initiating the intelligent service interactive platform of the matched business object being selected. The platform service start button 204 may be a physical key or a virtual key, which can be provided at a designated position on the screen. In some embodiments, with reference to FIG. 5, the platform service start button 204 may be located at a designated position of dialing area 201, such as at the bottom of the keyboard area. In other embodiments, with reference to FIG. 6, the platform service start button 204 may be located at a designated position outside the dialing area 201, such as at the top of the screen. When the platform service start button 204 is enabled by touching or pressing it or other means, the service of the intelligent service interactive platform corresponding to the matched business object may be initiated. When platform service start button 204 and the dial key are separately arranged, the platform service start button 204 may be configured to initiate the platform service, while the dial key performs the operation of dialing based on the input sequence. In some embodiments, the platform service start button 204 may also share a same key with the dial key. When platform service start button 204 shares a same key with the dial key, processor device 110 may configure the operations of such key. For example, when input device 130 detects the occurrence of touching or pressing on such key, processor device 110 may determine whether or not the matched business object currently being selected provides a service for intelligent service interactive platform; and in case that the determination is positive, processor device 110 may configure the operation of such key so as to give priority to the initiation of the platform service. Otherwise, processor device 110 may configure the operation of such key so as to give priority to the dialing operation. Alternatively, the user may configure the operation about such key according to actual usage habit. In some embodiments, the dial key may be configured to process dialing operation only. In some embodiments, the dialing operation may be configured to initiate the platform service. For example, when processor device 110 determines that matched business object currently being selected provides a service for intelligent service interactive platform, the dialing operation may be suspended. In some embodiments, the dial key may be configured to process a dialing operation for a first one or more operations or for a first certain time period, and to initiate the platform service for the following operations or for a second certain time period.

Figure 7:
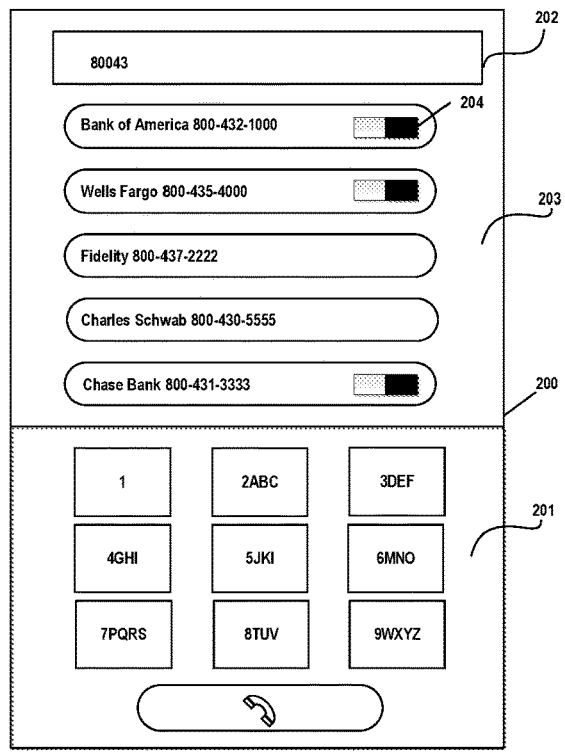
FIG. 7 shows another exemplary interface with platform service start buttons corresponding to business objects, according to some embodiments of the present disclosure.

In some embodiments, with reference to FIG. 7, at least one business object may be displayed in the matched business object displaying area 203, wherein each business object that can provide a service for the intelligent service interactive platform may be provided with a corresponding platform service start button, such as button 204. In another embodiment, platform service start button 204 is not limited to the form of key, and the platform can determine whether the service for intelligent service interactive platform corresponding to the business object should be initiated or not, by detecting whether there is a specific voice instruction or gesture instruction to initiate the service. In another embodiment, when input device 130 detects that the matched business object is selected, the service for intelligent service interactive platform may be directly initiated. For example, a predetermined time threshold may be set, and when the selection of the matched business object is detected, the user may take no further operations within a certain waiting time, and the intelligent service of the matched business object may be initiated once the waiting time exceeds the predetermined time threshold.

Once the intelligent service of the matched business object is initiated, processor device 110 may obtain user data. Based on the matched business object, processor device 110 may obtain a corresponding intelligent service menu of the matched business object corresponding to the user data from memory/storage device 120. In some embodiments, memory/storage device 120 may be co-located with processor device 110. In other embodiments, processor device 110 may communicate with cloud storage 160 through WiFi/GPRS or other network technologies to transfer data. In such case, processor device 110 may send user data and searching/matching instructions to cloud storage 160 (e.g., through communication interface 150), and receive intelligent service menu of the business object from cloud storage 160.

In one embodiment, user data may include location information. The location information may include the current geographical location of the user. The location information may also include the geographical location of the business object matching the input sequence input by the user. Processor device 110 may obtain the current geographical location of the user or the matched business object, and filter the service menu of the business object based on the location information to obtain the appropriate service menu applicable to the location information.

The form of above location information may change with the development of certain apparatuses and application technologies. In some embodiments, such location information may include GPS data. In some embodiments, such location information may also include the MAC address or IP address of the WiFi adapter or network adapter used by the user or the business object. In some embodiments, such location information may also include base station data or codes capable of identifying the location, such as Mobile Country Code (MCC), Mobile network number (MNC), Location Area Code (LAC), Cell ID (CID) data. In some embodiments, such location information may also be telephone area codes that have corresponding relationship with the administrative division. In some embodiments, such location information may also be the administrative division name corresponding to the user's current longitude and latitude, such as the city name, the province/state name, country name and so on.

Once such location information is obtained, processor device 110 may further filter the platform service menu of the business object, for example by searching such location information in the data field "location" corresponding to the platform service menu items. The filtered result may include platform service menu item(s) with the data field "location" corresponding to the location information. In this way, a platform service menu item suitable for such location information may be obtained.

Figure 8:
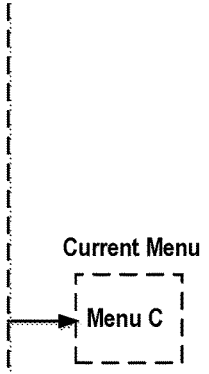
FIG. 8 shows an exemplary service menu database having location data field, according to some embodiments of the present disclosure.

FIG. 8 shows an exemplary service menu database having location data field. In FIG. 8, each business object may include at least one group of platform service menus (e.g., Menu A, Menu B, etc.). The menu items in different groups may not be the same. For example, Item A1, A3 and A3 may be different from B1, B2, and B3. Each group may include a data field "location." Based on the obtained location information, processor device 110 may obtain the service menu group suitable for such location information by, for example, searching the location data field for data matching the location information. For example, in FIG. 8, when the location information obtained by processor device 110 indicates that the current geographical location of the user or the business object is in Atlanta, processor device 110 may search the location data field for Atlanta, and select service menu group Menu C as the current menu group.

Figure 9:
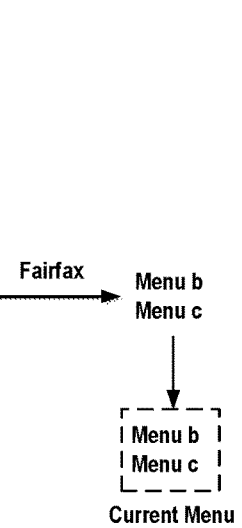
FIG. 9 shows another exemplary service menu database having location data field, according to some embodiments of the present disclosure.

FIG. 9 shows another exemplary service menu database having location data field. In FIG. 9, each business object includes a plurality of single-menu items, and each single-menu item includes its data field "location." Once processor device 110 obtains the location information of the user, processor device 110 may select all the single-menu items matching the location information. For example, when the location information indicates the location is in Fairfax, Va., processor device 110 may determine that Fairfax matches both "Washington D.C., Alexandria, Fairfax, Arlington" and "Mid Atlantic." Therefore, both menu b and c can be selected as being included in the current menu. Processing device 110 may feedback all selected single-menu items to the user according to a designated display mode.

Figure 10A:
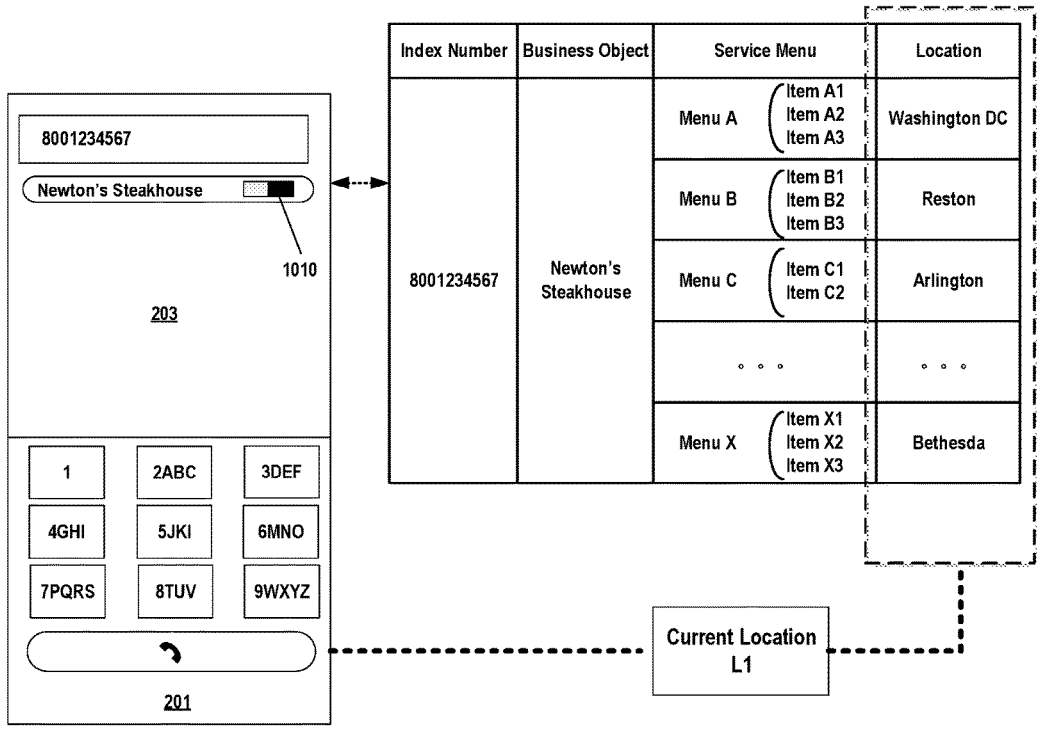
FIGS. 10A-10B show exemplary processes of providing service menu based on location information, according to some embodiments of the present disclosure.

Specifically, as for a business object with a plurality of service locations, the processor device 110 may filter the platform menu items according to the current location information, and select the platform menu (group) whose geographical location information is nearest to the current location. For example, as for a restaurant business object, with reference to FIG. 10A, when the user enters the telephone number of "Newton's Steakhouse" in the dialing area 201, an entry of "Newton's Steakhouse" is displayed in the matched business object displaying area 203. When the user clicks platform service start button 1010 besides such entry, processor device 110 may determine that the current location is location L1. Processor device 110 may calculate distances between the locations corresponding to each group of service menus in "Newton's Steakhouse" and the current location L1, and sort them according to the distance. When they are sorted, processor device 110 may select a group of service menus that is closest to the current location and feedback to the user. Such service menus may include the platform menus, such as dish menus, business information, transportation information, reservation information and the like, provided by the restaurant.

Figure 10B:
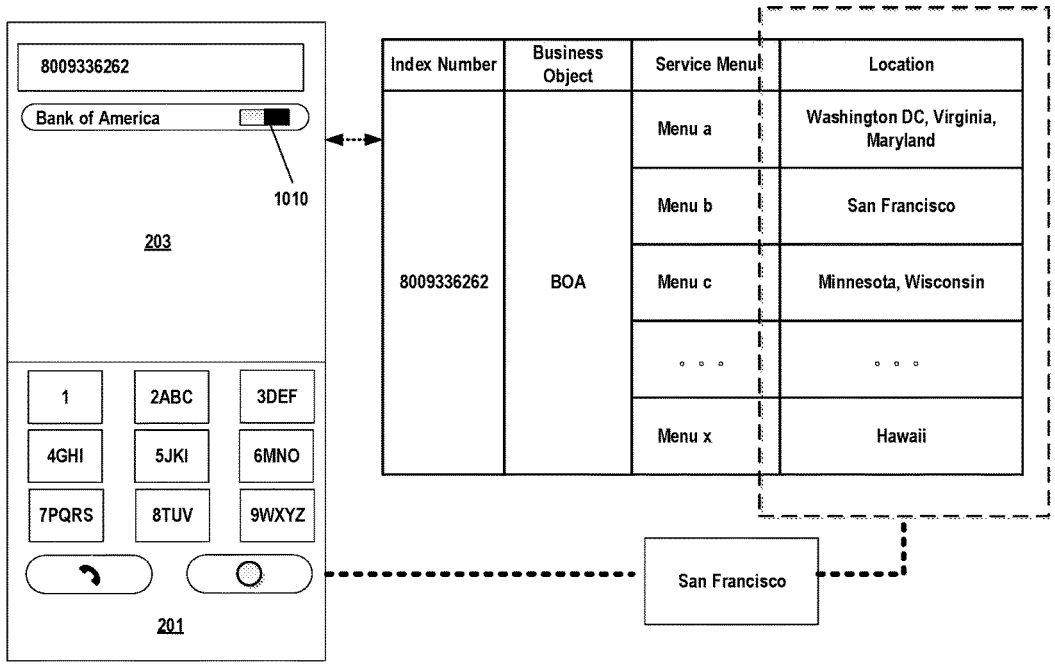

FIG. 10B shows another exemplary process of providing service menu based on location information. In FIG. 10B, when a user calls the customer service number of Bank of America when he/she is in San Francisco, processor device 110 may detect that the current location of the user is in San Francisco. Processor device 110 may acquire the platform service menus including location data "San Francisco" among the service menus of Bank of America.

Figure 11A:
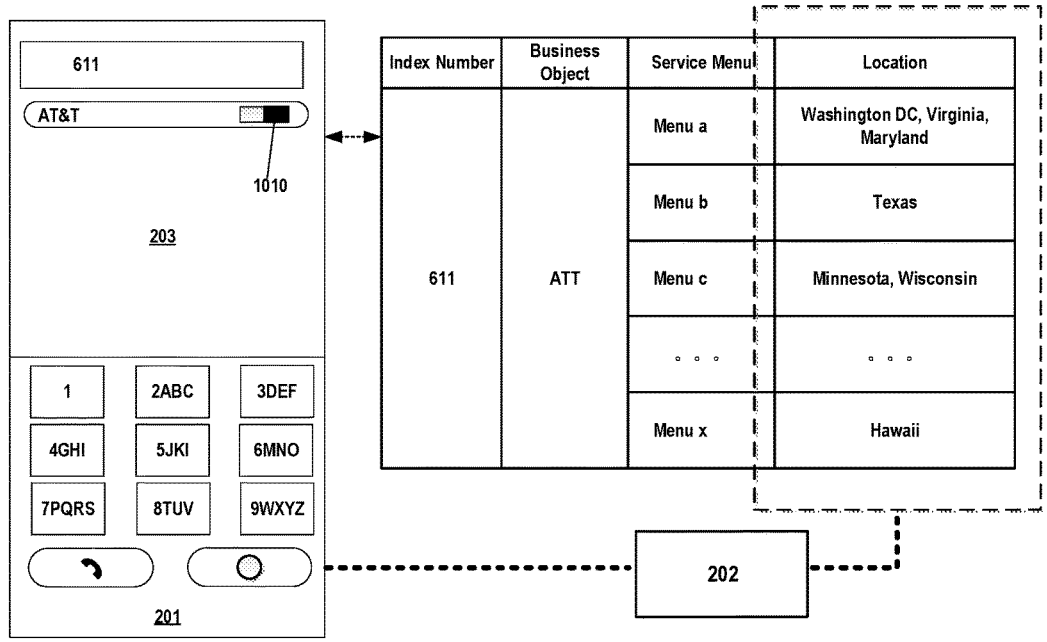
FIGS. 11A-11B show additional exemplary processes of providing service menu based on location information, according to some embodiments of the present disclosure.

FIG. 11A shows another exemplary process of providing service menu based on location information. In FIG. 11A, the phone number associated with the electronic device may be obtained by processor device 110 and the area code of the phone number may be extracted to determine the location associated with the area code. For example, the user may use his/her phone to dial AT&T's customer service number 611. The phone number of the user's phone used to dial the 611 number can be obtained and the area code 202 may be extracted to determine that the phone number is in the Washington D.C. area. Based on this location information, Menu a, whose location data field includes Washington D.C., may be selected as the service menu to be feedback to the user.

Figure 11B:
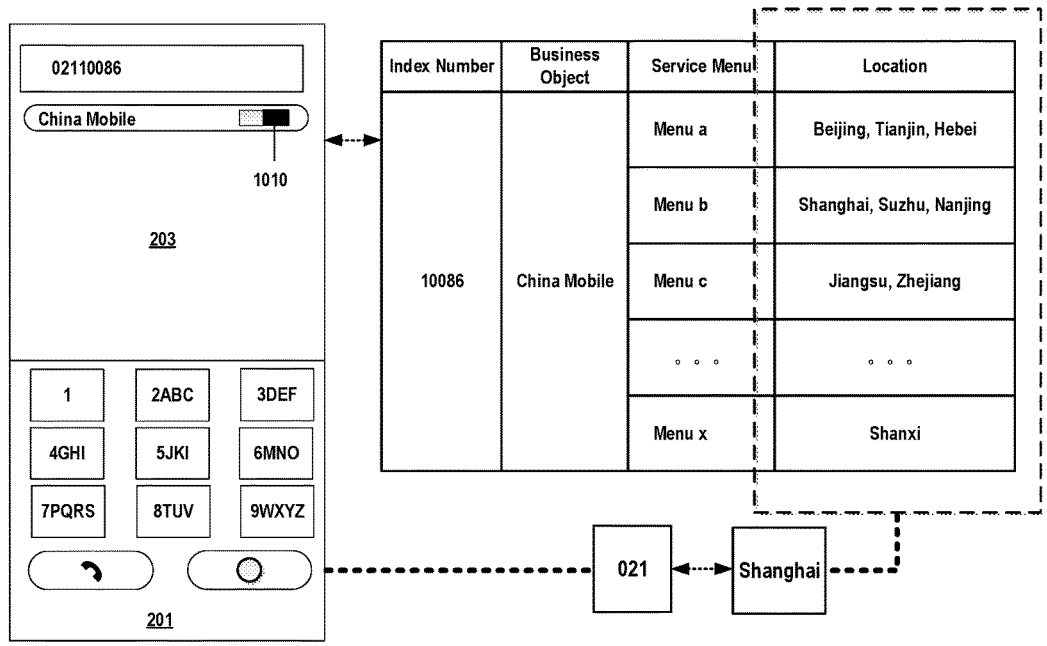

FIG. 11B shows another exemplary process of providing service menu based on location information. FIG. 11B shows a communication operator related business object China Mobile. Processor device 110 may select service menus (group) of the communication operator according to a specified geographical location. For example, when the user dials 02110086, which is the service number of China Mobile Shanghai Division (the area code of Shanghai is 021), processor device 110 may determine that the location information of the business object (China Mobile) is Shanghai. Processor device 110 may further detect that the user initiates the intelligent service interactive platform of the business object by clicking button 1010. Then processor device 110 may select the service menu whose application zone is "Shanghai" (Menu b) from the service menus provided by China Mobile.

In another embodiment, user data may include the interaction history between the user and the matched business object. In some embodiments, each business object may include a data field for recording the interaction history. Every time the user finishes an interaction with the business object, processor device 110 may store the interaction record into the data field. When current service for intelligent service interactive platform is initiated, processor device 110 may read out the interaction history from the data field, and filters the platform service menus of the business object according to the user data. The interaction history may include the latest interaction record, or may include multiple earlier interaction records.

FIG. 12 shows an exemplary service menu selection process based on interaction history information. In FIG. 12, a shipping company (UPS) may include data fields such as status and status auxiliary information. Processor device 110 may obtain a status of "unhooked" and a status auxiliary information of "inquiring the price and time required for shipping from xxx to yyy" by reading the interaction history between the user and the business object; and then processor device 110 may filter the platform service menus according to the obtained user data (e.g., interaction history), and assign service menu item "New Order" with a higher priority over "Search Order" for display or feedback because the user is more likely to make a new order instead of search an existing order when he/she hasn't booked any shipping order.

FIG. 13 shows another exemplary service menu selection process based on interaction history information. FIG. 13 shows a ticketing-related business object. Processor device 110 may obtain a status of "Ticketed" and a status auxiliary information indicating the detailed information of the ticket by reading the interaction history between the user and the business object. Then processor device 110 may filter the platform service menus according to the obtained user data (e.g., interaction history), and assign service menu items "Change Ticket" and "Seat Upgrade" a higher priority over "Ticket Info" and "Buy Ticket" for display or feedback to the user. Processor device 110 may also display activities located in New York City in the platform service menu item "activities recommendations" with higher priority, while making activities from 7:00-8:00 PM on Jul. 5, 2014 not to be displayed or be delayed to be displayed after other items because such activities will likely conflict with the musical.

Besides the above described transaction records, interaction history may also include the user's account information under the business object. For example, the interaction history may include the user's name, password, and bank account. Processor device 110 may further obtain the interaction history under the business object according to the account information, and filter the platform service menus according to the obtained interaction history.

In some embodiments, for a banking-related business object, processor device 110 may obtain current status of the user's account according to the user's account information. For example, if processor device 110 determines that foreign currency exchange is currently present under the user's account, processor device 110 may filter the platform menus of the business object according to the user data (e.g., current status), to assign a higher priority to platform menu item such as "exchange rate quotation" for display or feedback to the user over menu items such as "fund inquiry," "stock recommendation," etc.

In some embodiments, for a catering-related business object, processor device 110 may obtain current status of the user's account according to the user's account information. For example, if processor device 110 determines the user's account has booked a dinner, processor device 110 may filter the platform menus of the business object (e.g., the restaurant where the user wants to go for the dinner) according to the user data, to make the platform menu item such as "menus inquiry" or "recommended food" have higher priority over the platform menu item such as "booking" or "evaluation".

In some embodiments, user data may also include the input history of the user. For example, processor device 110 may record the input history (e.g., the entire history or for a certain length or times) and analyze the input history. For example, processor 110 may analyze the input history for a certain time range and sorted the input records according to the repeated times. Processor device 110 may then save those records having the repeated times above a certain threshold. Processor 110 may filter the platform service menu according to the recorded input history.

FIG. 14 shows an exemplary service menu selection processor based on input history. In FIG. 14, a ticketing-related business object Telecharge has an index number (e.g., telephone number 800-447-7400). According to the user's input history (for example, the user's input history includes an entry "the lion king"), processor device 110 may filter the platform menus of the business object based on the user data, to make the platform menu items associated with "the lion king" have higher priority over other platform menu items.

In another embodiment, user data may also include the user's personal information. The user's personal information may include the user's age, gender, preference and so on. Processor device 110 may obtain the user's personal information by analyzing the inputs of the user. Processor device 110 may further interact with the user so as to obtain the user's further personal information, and store personal information feedback from the user. Then, processor device 110 may store the obtained personal information of the user, and filter the platform service menus according to the stored personal information of the user.

In another embodiment, user data may also include information currently being input by the user. During intelligent service interaction between the user and a business object, the user may submit further input information. Processor device 110 may obtain the information being input via input device 130, and filter the platform service menus according to such information.

In another embodiment, user data can be further combined with system parameters of system 10. For example, user data may include current system language. Processor device 110 may obtain the current system language, and transform the platform service menus into a form displayed in the current system language.

In another example, user data can also include current system time. Processor device 110 may obtain the current system time, and filter time-indicating data field of the platform menu item provided by the matched business object, so as to obtain the platform menu items appropriate to the current time. For example, processor device 110 may filter the platform menus according to the current system time, so as to block out the platform menu items that have expired or have not started yet. For example, processor device 110 can notify the user according to working hours for inquiring the services provided by the matched business object according to the current system time. For example, processor device 110 may notify the user that the customer-service provided by the staff is not currently available.

With respect to the above-mentioned display priority or delayed to be displayed, processor device 110 can change display levels of corresponding platform menu item, or mark corresponding platform menu item. In some embodiments, processor device 110 can upgrade the display level of the platform menu item whose display has higher priority, for example into an upper display level of the menu which is at least one level higher. Similarly, processor device 110 may downgrade the display level of the platform menu item that need to be delayed to be displayed, for example into a lower display level that is at least one level lower. In some embodiments, processor device 110 can reorder the platform menus according to the determination that whether or not display priority is needed, so that the display order of the platform menus is consistent with the requirement of the display priority. For example, processor device 110 can set the display level of the platform menu item, so that in the first level, only the platform menus having display priority (e.g., prioritized display order) are displayed. In some embodiments, processor device 110 can sort the platform menus according to the determination that whether or not there are any platform menu items need to be delayed in display, and block those platform menu items that need to be delayed in display.

The intelligent service interactive platform menu corresponding to each business object stored in the memory/storage device 120 may be of a tabular data format or a tree-type data format. For example, the menu data may be of xml data format, Json data format, or a linked object data format.

According to some embodiments, processor device 110 can generate platform menus of a business object according to service menus provided by the business object in advance. For example, processor device 110 can employ visualization technologies to visualize the existing voice menus of the business object, and obtain corresponding visualization result of the voice menu. Processor device 110 may generate menu item data of the intelligent service interactive platform based on the visualization result of the voice menu.

In one embodiment, according to the voice visualization result of each menu item in the voice menu, each menu item is treated as one linked object, wherein each linked object includes one or more different the data field, such as displayed text, menu content, parent node, related nodes, menu type, priority, and so on; and linked object group including one or more menu item may form a menu.

FIG. 15A shows an exemplary voice menu structure. In FIG. 15A, a business object has a three-level voice menu, including a main menu (e.g., menu item A, B, . . . N), a first level submenu (e.g., menu item A1-Aj, B1-Bk, . . . N1-Nm), and the second level submenu (e.g., menu item a21, a31, a32, b11, b31, bk1, n11, n12, nm1, nm2). Voice content included in each menu item in the voice menu may be extracted by means of voice recognition technology. The extracted voice content may be translated into text form and then stored in, for example, displayed texts data field of the corresponding menu item. FIG. 15B shows an exemplary table storing the text information extracted from the voice content. In FIG. 15B, the upper level menu node corresponding to each menu item may be recorded and stored in, for example, parent node data field of the corresponding menu item. Each menu item may also include a menu content data field for recording actions, links, data, texts, pictures, pointers, computational formulas, etc., which are associated with the menu item. Each menu item may further include a related node data field for recording menu item of its parent node, child node, or other menu items that do not belong to the same parent node of this menu item. Each menu item may further include a priority data field for recording effect of the operation of the user data or the business object on the display level of the menu item. According to the data fields of each menu item, corresponding platform menu can be generated. For example, according to the contents of the data fields parent node and priority correction parameters, final display level of the menu item may be determined. According to the data field displayed content, the icon corresponding to the menu item and is to be displayed on the interface can be determined. According to the content of the data field related nodes, relationship between the menu item and other menu items can be determined. In another embodiment, the data field related nodes and the data field menu content may also be combined and processed together.

In another embodiment, a tree-type data structure can also be employed to store text recognition result of the voice menu of the business object. FIG. 15C shows an exemplary tree-type structure. In FIG. 15C, each menu item node in the tree-type data structure may include a displayed content data field and a menu content data field. The displayed content data field may store data such as the icon for indicating the menu item. The menu content data field may store description of the content of the menu item, such as links, texts, pictures, data, pointers, computational formulas and the like, or operational instructions.

Depending on the type of the menu content data field, the menu item nodes in the tree-type data structure may include two types. One type of the menu item node is indication node such as node Q1, Q2, and Q3. The menu content data field of an indication node may include a pointer pointing to one or more specific nodes. When processor device 110 detects that the user selects a menu item of an indication node, an operation of jumping to the corresponding specific node is performed according to the pointer of the menu content data field of the menu item. For example, as for node Q1, the content of its menu item is a pointer pointing to its next level node. Processor device 110 may read the content of the displayed content data field of its next level node, and display menu of the next level node of node Q1. In another example, node Q2 may include a pointer pointing to its previous level node. Processor device 110 may read the content of the displayed content data field of its previous level node, and display the menu of its previous level node, performing an operation of returning to previous level menu. In another example, node Q3 may include a pointer pointing to the root node. Processor device 110 may read out the content of the displayed content data field of the root node, and display menu of the root node, performing an operation of returning to main menu.

The other type of menu item node is content node such as node P, the menu content data field of which may include data file or operational instructions. In some embodiments, when processor device 110 detects that the user selects a menu item of a content node, content of the menu content data field of the menu item may be read out, and web page, text, image, etc. corresponding to the data field may be displayed to the user. In some embodiments, processor device 110 can also read out the content of the menu content data field of the menu item, execute specific operational instruction, such as dialing instruction or input instruction. In some embodiments, the menu item of a content node may also include a node route data field for recording a key sequence corresponding to all the nodes in the access route from the root node to the menu item of this content node. For example, as for the menu item of the node P, its node route data field may record a key sequence corresponding to all the nodes in the access route from the root node to node P, i.e., "O-P1-P2-P". When processor device 110 executes a dialing instruction, processor device 110 may call the designated number in the instruction, and also may obtain a corresponding dialing sequence according to the node route data field and then dial such corresponding dialing sequence. When processor device 110 executes an input instruction, processor device 110 may prompt the user to input (for example, an input box may be displayed to prompt the user to input things in the input box). The input signal may be detected by input device 130. The input information from the user may be obtained based on the input signal. Processor device 110 may execute an input instruction, and perform process based on the input information, for example storing the input information such as the interactive history, the user account, input history and the like, into the corresponding data field of the user and the business object. Moreover, processor device 110 may also perform inquiry based on the input information, and return an inquiry result so as to display the inquiry result to the user.

Figure 15D:
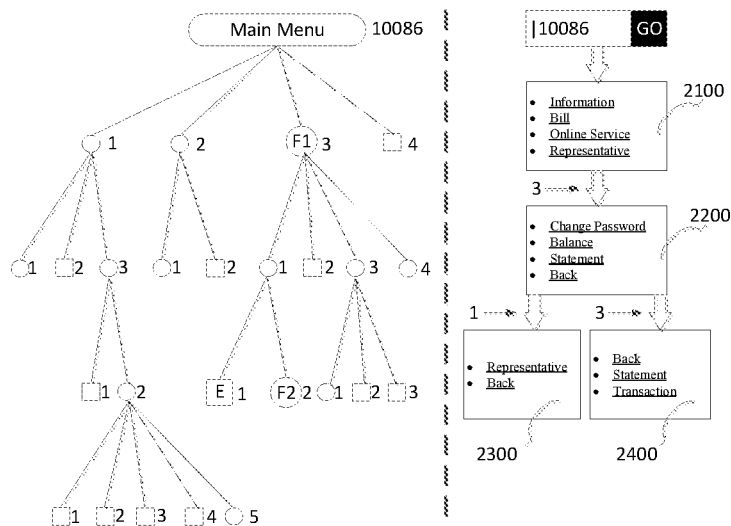
FIG. 15D shows an exemplary operation of the intelligent platform, according to some embodiments of the present disclosure.

FIG. 15D shows an exemplary operation of the intelligent platform. As shown in FIG. 15D, when a user inputs "10086" and initiates the intelligent service interactive platform, matched platform menu items may be obtained, and a first level menu items may be sequentially arranged in a corresponding main menu interface 2100. The corresponding platform menu items employ a Json tree-type data structure. Each node may represent one menu item, and correspond to a specific numerical value. The numerical value of each node may correspond to an option key corresponding to such node. For example, as shown in FIG. 15D, when the user clicks a numeric key of "3" at the first level menu item or inputs a numerical value "3", processor device 110 receives input signal captured by input device 130, and obtains a menu item node F1 corresponding to "3". Processor device 110 detects that the menu item node F1 is an indication node that points to its next level menu. Processor device 110 then obtains the displayed content data field of the next level nodes of F1, and displays in the next level interface 2200 the contents of the displayed content data fields of those next level nodes. When the user continues to input "1", processor device 110 then obtains a next level menu corresponding to digit "1", and displays it via an interface 2300. On the other hand, if the user inputs "3", processor device 110 obtains a next level menu corresponding to digit "3", and displays it via an interface 2400. In the interface 2300, when the user selects Representative (i.e. a menu item corresponding to a node E), processor device 110 may also obtain a dialing sequence corresponding to the node E. In one embodiment, processor device 110 may read out the content of the node route data field of node E, e.g., numerical values corresponding to all the nodes in the access route from the root node to node E. As shown in FIG. 15D, key values of the nodes passed by the access route from the root node to node E respectively correspond to 3, 1, 1. Processor device 110 then obtains a node route "3-1-1", combines it with the input sequence so as to obtain a dialing sequence of "10086-3-1-1", and makes a call according to such sequence. In one embodiment, according to actual progressing route, designated delay/waiting time may also be added into corresponding digits obtained at each level. For example, x seconds delay are set between 10086 and 3, x1 seconds are set between 3 and 1, and x2 seconds are set between 1 and 1, wherein x, x1, and x2 may be the same or may be set as different values. In another embodiment, processor device 110 may also read out content of the menu content data field of node E (for example, such content may be "call 13800000000"), and processor device 110 may obtain instruction of "call the number" and a corresponding number sequence (i.e. the designated number "13800000000"). Processor device 110 may then execute the dialing instruction. In another embodiment, processor device 110 may also deliver the inquiry information via network interface 150 according to the matched business object, and receive a feedback result from online service 170. The feedback result may include the platform menus of the business object. For example, online service 170 may include data about the service items and data about menu levels, which may be obtained from the business object. A corresponding platform menu may be generated using such a state machine, according to service menu items and the menu levels of the business object. In another embodiment, processor device 110 may extract the menu data submitted by the business object, and use HTMLS technology to construct the intelligent service interactive platform of the business object.

In some embodiments, the intelligent service interactive platform menu data corresponding to a business object may be dynamic.

Figure 16:
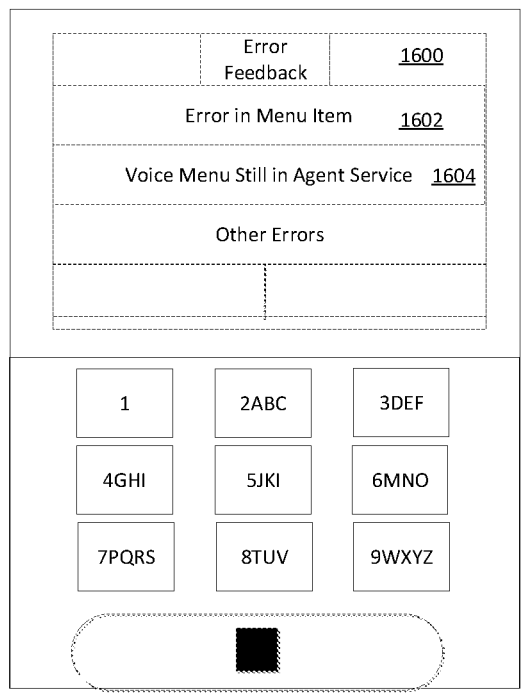
FIG. 16 shows an exemplary interface for collecting feedback information, according to some embodiments of the present disclosure.

In some embodiments, system 100 may further include a feedback mechanism, in which feedback information of a user may be collected through input device 130. Processor device 110 may obtain feedback information from the user regarding the intelligent service interactive platform menu of a business object through input device 130. The platform menu may be in an active or interactive session or may finish an interactive session. FIG. 16 shows an exemplary interface for collecting feedback information. In FIG. 16, when input device 130 detects that a user clicks on item 1602 of a feedback menu 1600, which indicates that there is an error (or errors) in one or more menu items, processor device 110 may respond to the feedback by providing guidance to the user for receiving additional information about the error. In another example, when input device 130 detects that a user clicks on item 1604, which indicates agent or representative service that should direct the user to a human agent still includes recorded or synthesized voice menus, processor device 110 may respond to the feedback by, for example, providing additional guidance to the user for receiving additional information about the error. In one embodiment, processor device 110 may further store the feedback information, i.e. feedback menu item and the problem, in memory/storage device 120, and mark or modify the menu items in question for further investigation. In another embodiment, processor device 110 may also relay the feedback information via communication interface 150 to online service 170, and update the feedback menu item in question through online service 170.

In some embodiments, the platform system may have an interface open to the associated business objects, so that the business objects can perform operations such as editing, modifying, adding, deleting, etc., on their corresponding intelligent service interactive platform menus through communication interface 150. For example, a business object can access the platform so as to obtain its corresponding platform menus. The business object can correct errors present in the platform menus, delete outdated data, add new menu items, or adjust the display level of a certain platform menu item. In some embodiments, processor device 110 may sent feedback information obtained from a user to a corresponding business object via communication interface 150, so that the business object can correct errors identified by the user.

In some embodiments, the platform system may further include an updating mechanism, in which processor device 110 can update the platform menu items corresponding to a business object. For example, an instant updating mode may be employed, wherein after the business object edits its corresponding platform menu items, processor device 110 records the edited content and replaces the original content stored in memory/storage device 120 with the edited content instantly. In another example, a periodic updating mode may be employed, wherein processor device 110 replaces menu items according to the edited content made by the business object periodically, such as once per day or once per week, etc. In a further example, a triggered updating mode may be employed, wherein processor device 110 detects whether any updating information made by a business object is available each time a user initiates the intelligent service interactive platform service relevant to the business object, and updates the service menu items if updating information is detected.

When processor device 110 obtains platform menus, processor device 110 controls output device 140 to display the platform menus in an intelligent service interactive platform interface according to a designated display mode.

Figure 17:
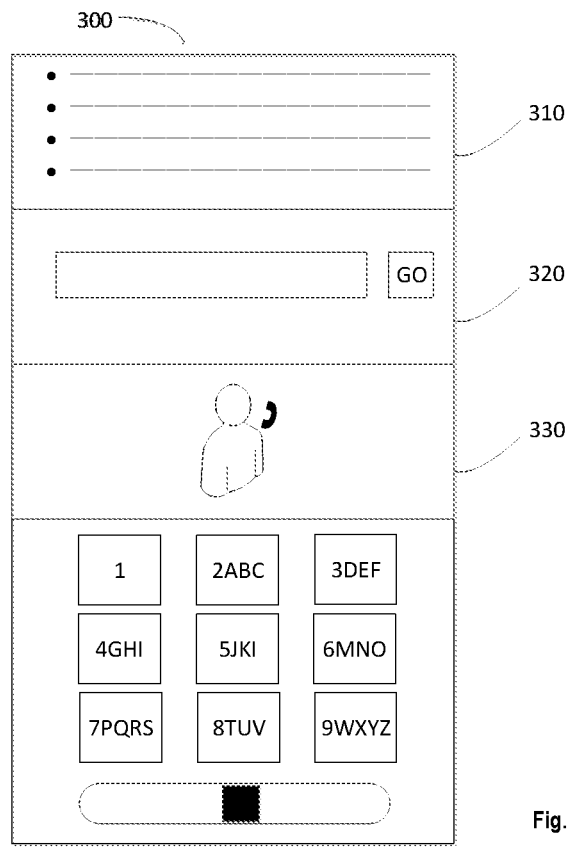
FIG. 17 shows an exemplary intelligent service interactive platform interface, according to some embodiments of the present disclosure.

In one embodiment, processor device 110 classifies platform menus into menu types corresponding to the designated display mode according to user data types and interactive forms required by the platform menus. FIG. 17 shows an exemplary intelligent service interactive platform interface 300. Interface 300 includes an information consultation related menu 310, an inquiry related menu 320, and a staff (representative) service related menu 330. Each type of menu can further include one or more levels submenu. Processor device 110 can control the display of the corresponding platform menus according to the menu types and also based on user data and interactive forms required by the menus.

Figure 18:
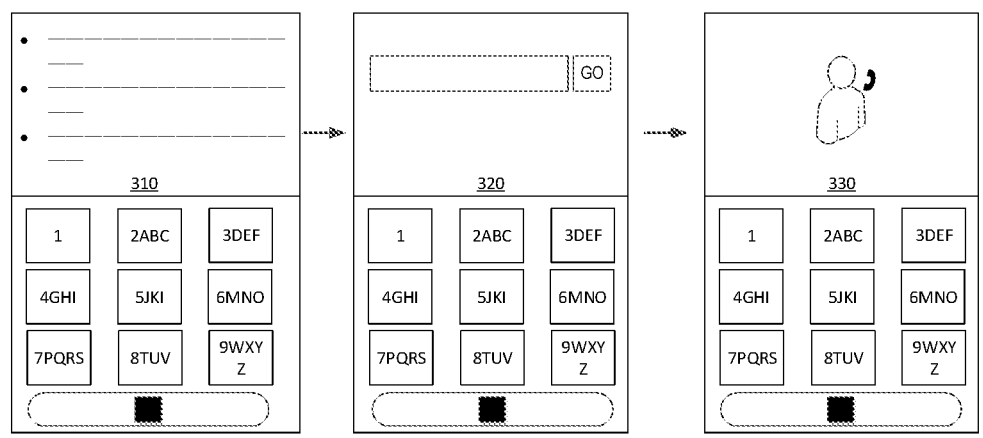
FIG. 18 shows a process of displaying different types of menus sequentially, according to some embodiments of the present disclosure.

Interface 300 of the intelligent service interactive platform can display one or more of types of menus in one screen. In one embodiment, as shown in FIG. 17, three types of menus are displayed on interface 300 of the intelligent service interactive platform and arranged in a designated way. In another embodiment, as shown in FIG. 18, according to the user's gestures or other predetermined instructions, different types of menus can be sequentially displayed on interface 300 of the intelligent service interactive platform.

When processor device 110 receives the user's input from input device 130, a menu type selected by the user is obtained. According to the menu type selected by the user, the menu type data field is searched in the menu items stored in memory/storage device 120, and one or more menu items that match the menu type can be extracted. The extracted menu items can be displayed to the user through output device 140.

According to some embodiments, processor device 110 detects whether the platform menu requires the user to perform a next input action, and classifies the platform menus that do not require the user to perform a further input action as the information consultation related menu 310. For example, for a banking-related business object, information consultation related menu 310 may include financial product recommendations, credit card recommendations, deposit plan recommendations, current interest rate/exchange rate and the like. In another example, for a ticketing-related business object, information consultation related menu 310 may include the newest program parades, latest sports result notifications, latest promotions, ticket price, information about the sold tickets and the like. In a further example, for a real estate related business object, information consultation related menu 310 may include housing information recommendations, introduction information of specific houses, latest housing price promotion information and the like. In another example, for a transportation related business object, information consultation related menu 310 may include a public transport schedule, the service time, ticket prices, maps/roadmaps, ticketing point information and the like. In another example, for a catering-related business object, information consultation related menu 310 may include menu, new product or recommended cuisine introduction, user evaluations, promotion activities, the telephone number/address of the business object and the like. In another example, for a shipping related business object, information consultation related menu 310 may include shipping information, service items, price list and the like.

Figure 19F:
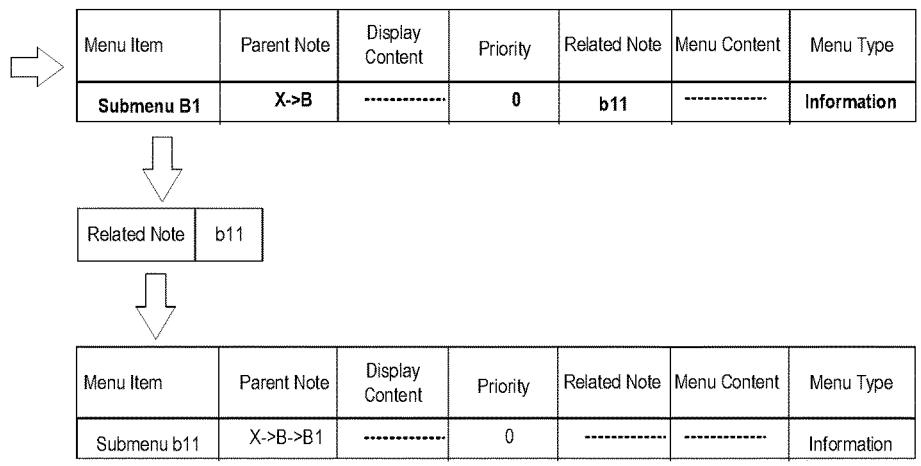
Figure 19G:
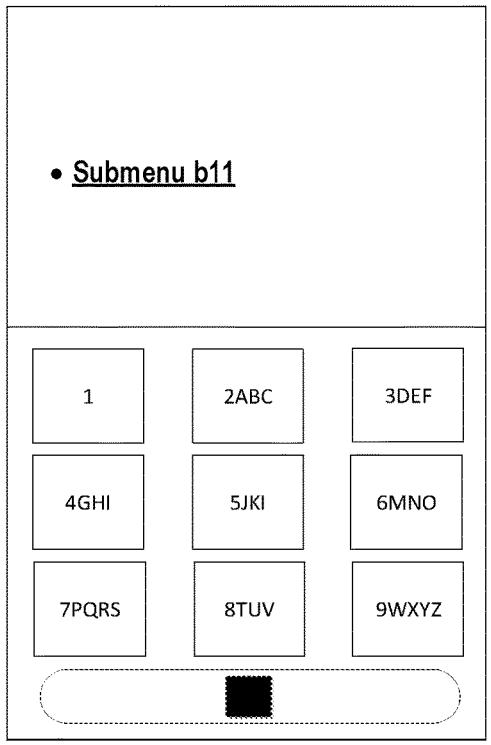
Figure 19H:
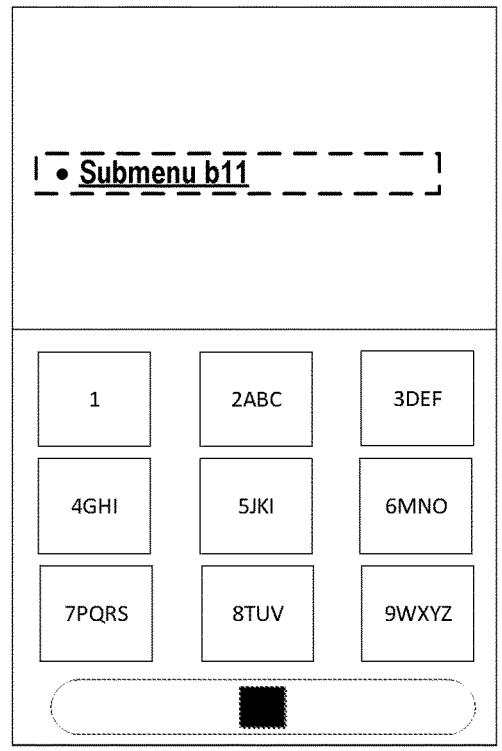

FIGS. 19A-19J show an exemplary process of displaying an information consultation related menu. Referring to FIG. 19A, when a user chooses the information consultation related menu 310 and would like to go further, processor device 110 searches for the menu item(s) whose menu type data field contains information consultation or related indicators, and displays the menu item(s) according to the corresponding display level(s). For example, FIG. 19B shows an exemplary table storing menu items and their related attributes. Processor device 110 may search the menu type data field of this table for the Information indicator. FIG. 19C shows a search result table including all menu items having an information menu type. FIG. 19D shows a menu generated by processor device 110 showing part of the menu items resulting from the search. The user may select a menu item displayed in the information menu, as shown in FIG. 19E. For example, the user selects Submenu B1. Input device 130 may detect the user's input signal regarding the selected menu item, and send the input signal to processor device 110. Processor device 110 obtains the menu item selected by the user according to the input signal, and detects whether or not it has related nodes and obtains the display level of its related nodes. When the related nodes exist and the display level of its related nodes is below the menu item, indicating that the menu item has lower level menu, processor device 110 traverses its lower level menu items, and forms a lower level menu. For example, FIG. 19F shows that related note b11 is below the selected menu item B1, and then processor device further enters into the corresponding record of submenu b11. FIG. 19G shows that submenu b11 is displayed. FIG. 19H shows that the displayed submenu b11 is further selected by the user. When the related nodes exist and the display level of its related nodes is above the menu item, indicating that the menu item is for returning to an upper level menu or returning to the main menu, processor device 110 jumps to its related nodes and displays corresponding menu items. When there are no related nodes, processor device 110 extracts the menu contents data field of the menu item. For example, FIG. 19I shows that submenu b11 does not have related notes, and the menu content of submenu b11 is extracted, which is a link. When the menu content data field of the menu item is a link, the content of the link, such as web link or text information, is displayed to the user. FIG. 19J shows that the content of the web link is displayed to the user.

Processor device 110 can display a platform menu that requires user input. Such menu may be classified as an input/inquiry related menu 320. FIG. 20A shows an exemplary inquiry menu 320. Inquiry menu 320 may further include an input box 322. Processor device 110 may filter the platform menus according to the information input by the user. For example, the menu content data field of a menu item can be searched according to the further input information to obtain an inquiry menu 320 whose menu content data field is consistent with the input information. Thus, the inquiry menu 320 is associated with the further input information of the user.

For example, for a banking-related business object, the input/inquiry related menu 320 may include current information of the user's account, bill query of the user's present account, query of balance, transactions and other online operations under the user's present account and the like. In another example, for a ticketing-related business object, the input/inquiry related menu 320 may include introductions of activities related to the input history of the user, promotion recommendations, as well as the ticket information under the user's account, ticket-selling stations, balance, introductions of activities related to the ticketing and the like. In a further example, for a real estate related business object, the input/inquiry related menu 320 may include introductions of real estate information based on the input of the user, or may include information about real estate under the user's account and the like. In another example, for a transportation related business object, the input/inquiry related menu 320 may include ticket query and transaction under the user's account, query and payoff of parking fees/refueling fees under the user's account and the like. In another example, for a catering-related business object, the input/inquiry related menu 320 may include coupons, booking information and the like under the user's account. In another example, for an express-delivery/take-out related business object, the input/inquiry related menu 320 may include the location query, the contact information of the operator in charge, the expected arrival time etc. of express-delivery/take-out under the user's account.

Figure 20D:
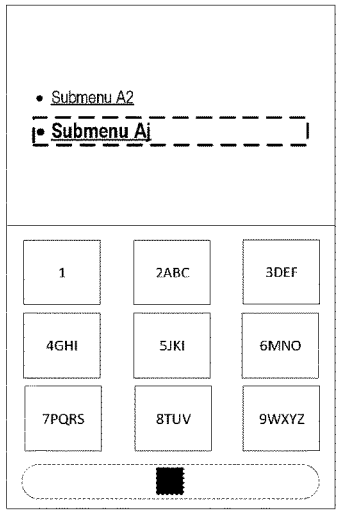
Figure 20E:
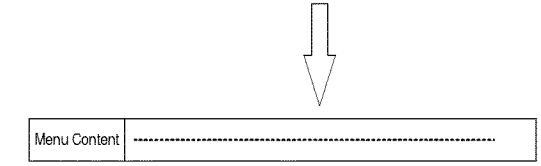
Figure 20F:
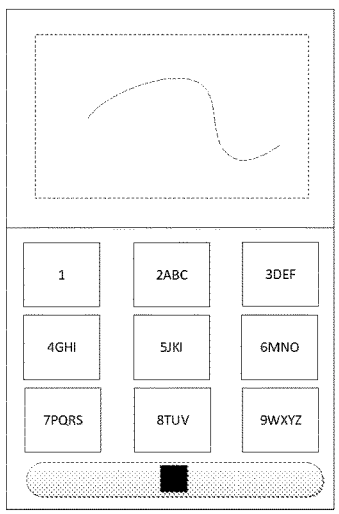

With reference to FIGS. 20A-20F, a user enters information in the input box 322 of the input/inquiry related menu 320. Input device 130 detects the input signal of the user, and delivers the input signal to processor device 110. Processor device 110 generates an input sequence according to the input signal. Further, processor device 110 obtains menu items whose menu type data field includes inquiry or related indicators (FIG. 20B), and displays them based on their display levels (FIG. 20C). Then, processor device 110 further obtains the menu items selected by the user according to the detect result of the input device 130 (FIG. 20D) and extracts the menu content data field of the selected menu item (FIG. 20E). Processor device may further perform corresponding operations according to the input sequence input by the user so as to obtain inquiry results (FIG. 20E) and display the results (FIG. 20F).

Figure 21:
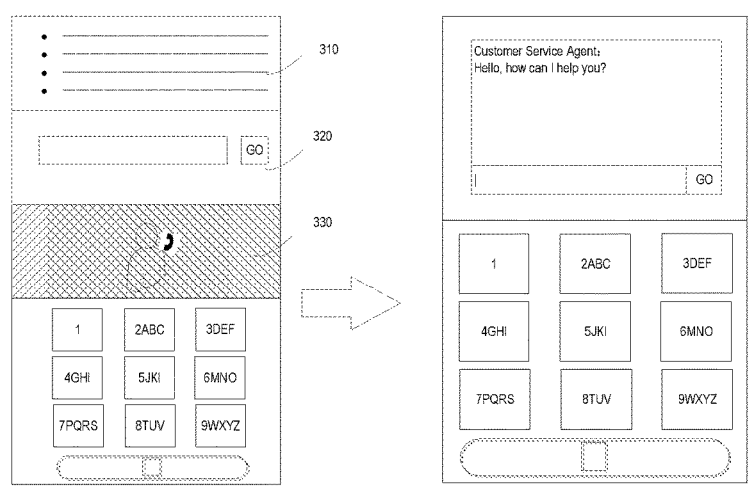
FIGS. 21-22 show an exemplary processor of invoking staff service, according to some embodiments of the present disclosure.
Figure 22:
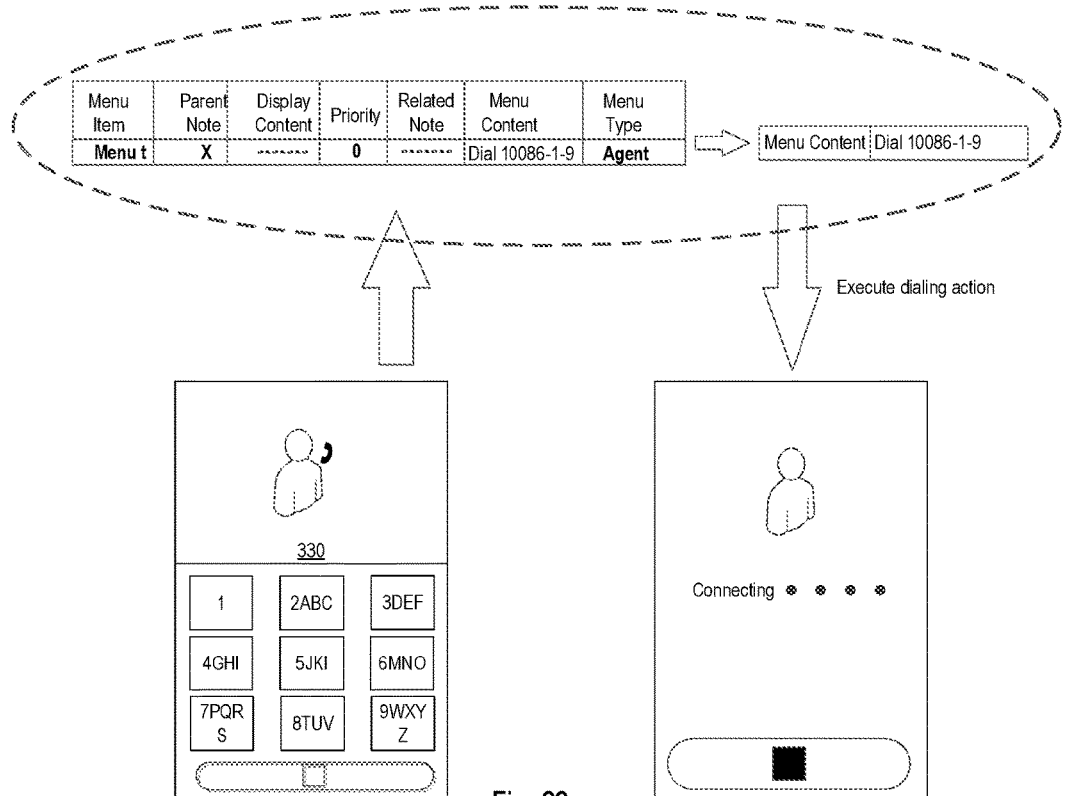
Figures 23A, 23B:
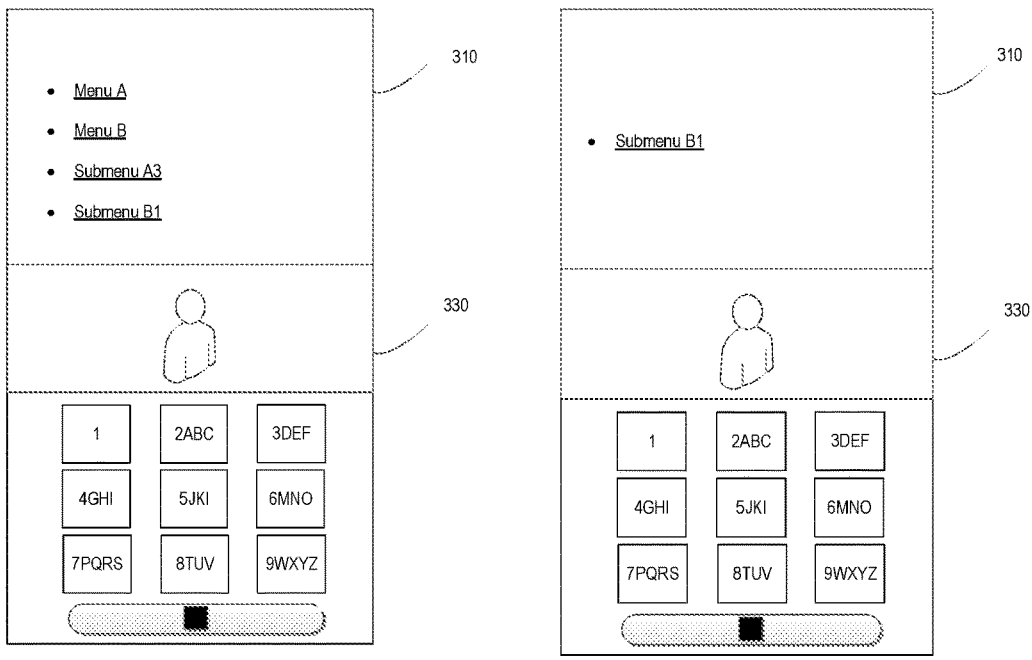
FIGS. 23A-23C and 24A-24D show exemplary displays of staff service related menu, according to some embodiments of the present disclosure.
Figure 23C:
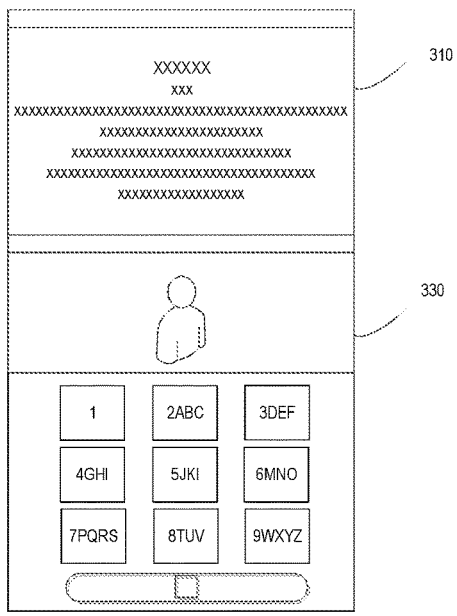
Figure 24A:
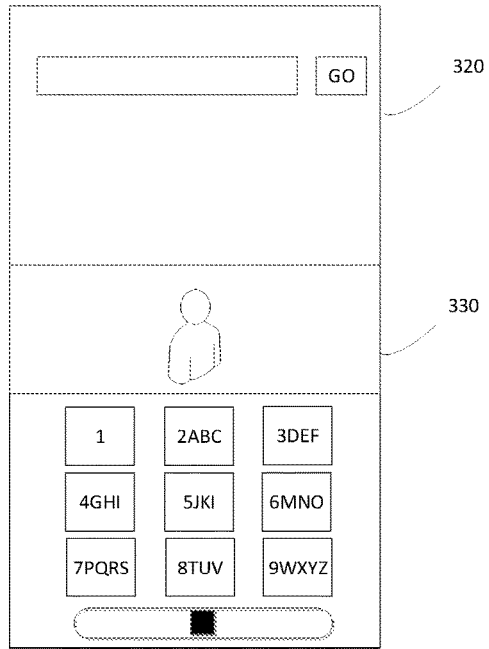
Figure 24B:
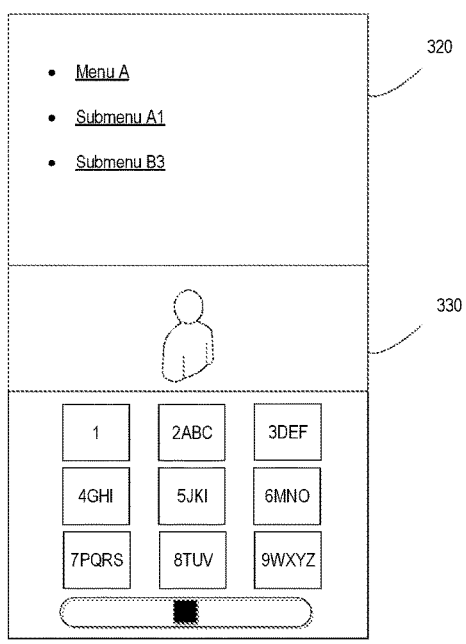
Figure 24C:
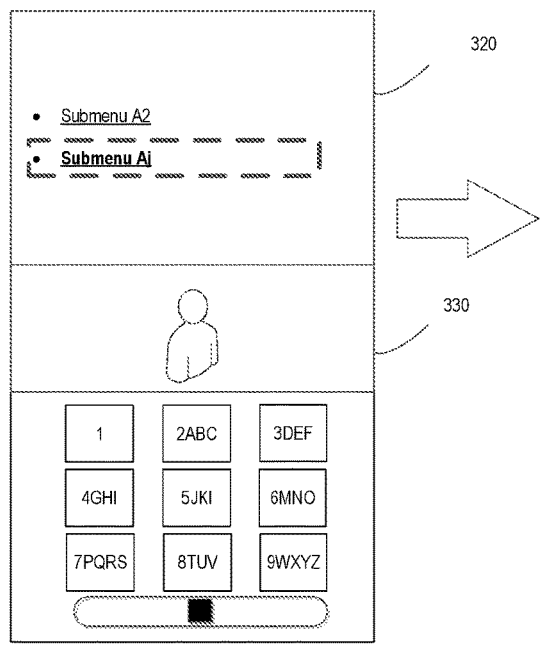
Figure 24D:
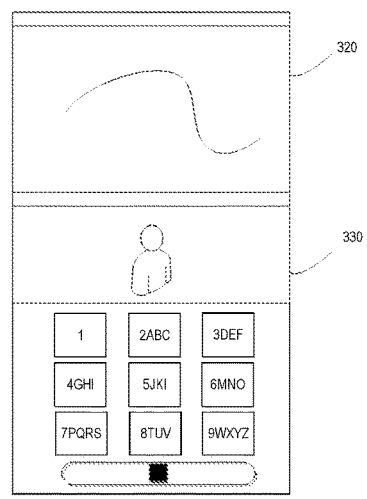

Processor device 110 may directly jump to the platform menu of agent service, such as the staff service related menu 330. In one embodiment, with reference to FIG. 21, for a business object who provides an online staff service, its staff service related menu 330 may include a platform menu which directly jumps to the online staff service, and the platform menu may include a web link pointing to the online staff service interface. When input device 130 detects that the user has tapped on the staff service related menu 330, processor device 110 obtains the content of the menu content data field of the menu item so as to obtain a corresponding URL link, opens such link, and displays the online staff service interface to the user. In another embodiment, for a business object that only provides staff voice service, with reference to FIG. 22, its staff service related menu 330 may include a platform menu which can directly jump to the staff voice service. For example, the menu content data field of the menu item may be "dial 10086-1-9", indicating that the dialing instruction contains a predetermined number sequence. After processor device 110 obtains the corresponding data field content, a dialing action may be initiated, so that the number sequence in the menu content data field is extracted in order to execute the dialing action. The user is then directly provided with the staff voice service. In some embodiments, the menu content data field of the menu item may also include an instruction of acquiring a number sequence corresponding to the menu item. Processor device 110 can obtain a corresponding node route according the menu item (e.g., a key sequence of all the node in the access route from the root node to the menu item node), and then obtain a corresponding number sequence according to node route, for example by means of combining a telephone number corresponding to the business object and the node route.

When the user selects a lower level menu of one type of menu via input device 130, processor device 110 may detect the related nodes data field of the lower level menu item and the display level corresponding to its related nodes, so as to determine whether or not the lower level menu item points to other menu items. When there are related nodes and the display level of its related nodes is below the menu item, indicating that the menu item has a next lower level menu, processor device 110 obtains the next lower level menu according to the related nodes of the menu item. When there are related nodes and the display level of its related nodes is above the menu item, processor device 110 may jump to its related nodes, and display the corresponding menu. When there are no related nodes, processor device 110 may extract the menu content data field of the menu item. When the menu content data field of the menu item is a link, the link content such as a web link, a picture, or text information, may be displayed to the user. Further, during the jump process, processor device 110 can further trigger a prompt mode to prompt the user, for example, by means of multimedia.

In some embodiments, the designated display mode may further include designated display timing. For example, with reference to FIGS. 23A-23C and 24A-24D, when the information consultation related menu 310 or the input/inquiry related menu 320 has at least two levels of menus, as for each level of its menus, the staff service related menu 330 is always kept to be displayed, so that the user is capable of directly obtaining the staff service via the staff service related menu 330 at any level of the information consultation related menu 310 or the input/inquiry related menu 320.

In another embodiment, processor device 110 may also display filtered platform menus at positions corresponding to their original positions in the voice menu, according to the number of levels of the voice menu and the setting of each level. For example, with reference to FIGS. 15A-15C, processor device 110 obtains the platform menu items according to the voice menu of the business object, and records the level of each platform menu item that appears in the voice menu and voice content of each platform menu item. When the intelligent service interactive platform of the matched business object is initiated, processor device 110 obtains a corresponding platform menu item according to the user data, and displays the platform menu item in line with corresponding display level.

In some embodiments, the designated display mode also includes display of the platform menu according to predetermined display level. The predetermined display level may be the original display level of the platform menu. For example, the platform menu item may be consistent with its level in the voice menu, and may also at a display level updated by the user data. Processor device 110 may read out the parent node data field and the priority data field of the platform menu item. When the priority data field is zero, the display is performed according to its original display level. When the priority data field is +i, the display is performed i levels ahead with reference to the parent node of the menu item. When the data field priority is −i, the display is performed i levels below with reference to the parent node of the menu item.

Figure 25:
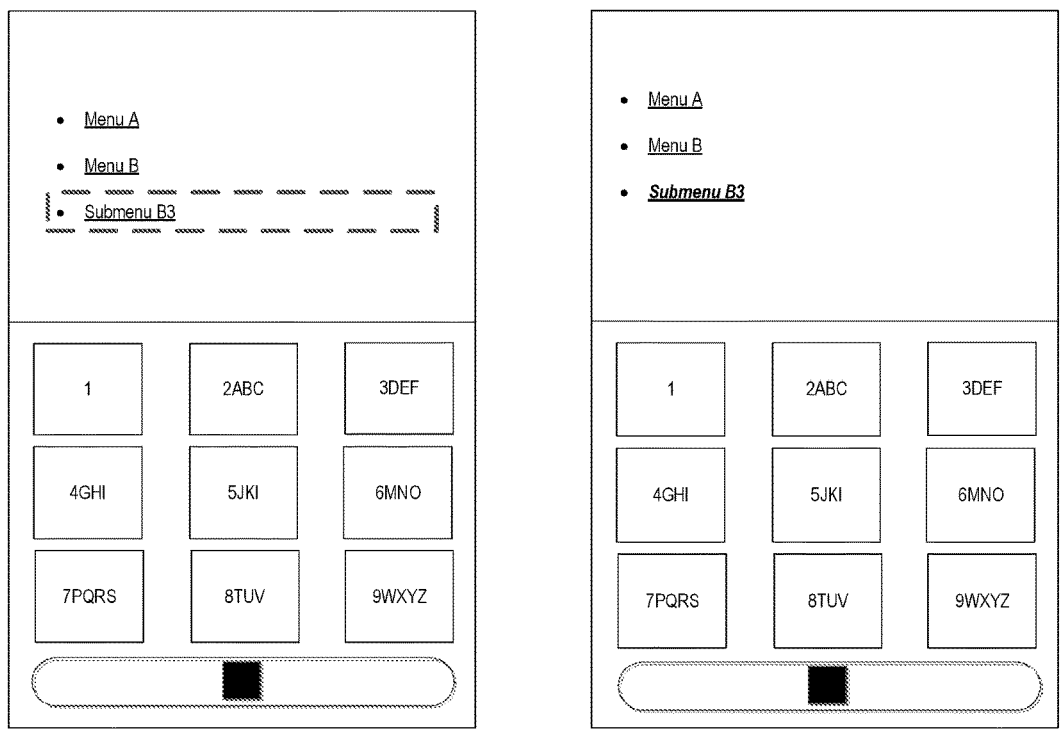
FIG. 25 shows exemplary designated display mode, according to some embodiments of the present disclosure.

In some embodiments, the designated display mode may also include the display of the designated platform menus according to designated forms. For example, with reference to FIG. 25, for the platform menus that have a positive priority, the designated display mode includes making the platform menu item as a default option item in the current display menu group, or displaying the display icon or text of the menu item by emphasizing colors or font or word size.

Figure 26:
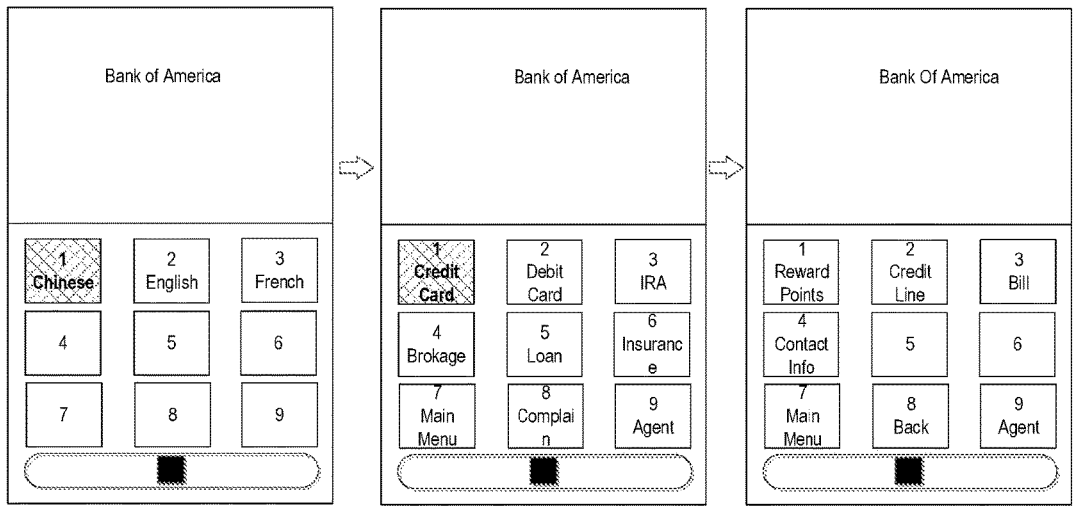
FIG. 26 shows exemplary layouts of a platform menu, according to some embodiments of the present disclosure.

In some embodiments, the designated display mode may also include the display of the platform menus in a predetermined layout. For example, with reference to FIG. 26, individual platform menu items may respectively mapped into the dial keys of the dial pad, thus the main parts of the original layout, enhancing the switching speed between interfaces, and avoiding the discomfort brought to the user caused by frequent switches of interfaces due to the change of the displayed platform menus. Moreover, the platform menu item may also be sequentially displayed on the display screen in form of lists or icons.

Input device 130 may continuously detect the inputs performed by the user in the intelligent service interactive platform interface 300 or its next subsequent-level interface, until the user finishes the service provided by the matched business object and withdraws from the interactive platform. For example, when processor device 110 detects that the user clicks the withdraw button or the user makes a withdraw gesture, or when input device 130 receives other input signals indicating withdrawal of the user, or when a time period during which the user performs no operation exceeds a threshold, processor device 110 performs an operation of withdrawing the intelligent service interactive platform.

Figure 27:
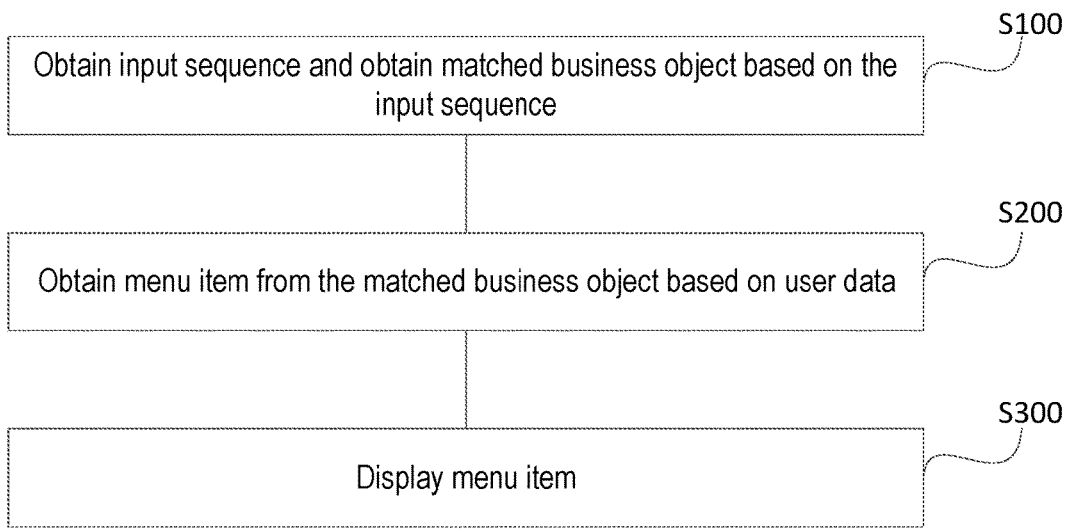
FIG. 27 is a flow chart of an exemplary method for implementing an intelligent service interactive platform, according to some embodiments of the present disclosure.

According to some aspects of the invention, a method for implementing an intelligent service interactive platform is provided. With reference to FIG. 27, one embodiment of the method for implementing an intelligent service interactive platform may include: a step S100, for obtaining an input sequence of a user, and obtaining matched business objects based on the input sequence; a step S200, for obtaining the platform menu items from the matched business objects based on the user data; and a step S300, for displaying the platform menu items suitable for the user data to the user.

Specifically, step S100 may include detecting the input signals of the user, and obtaining an input sequence according to the input signals of the user. The input signals of the user may include signals input by the user through input device 130, by means of voices, gestures, touch or press on keys of a keyboard, recognition of specific graphs, etc. By performing voice recognition, graphic recognition, dynamic recognition, three-dimensional shape recognition, and detection of coordinate of touch point or pixel and the like on the input signals, the input sequence can be obtained according to the input signal. After the input sequence is obtained, it may also include matching the business object according to the input sequence. Specifically, the input sequence may be compared with contents of the data fields corresponding to the business object. For example, the input sequence is compared with the data fields associated with the business object, such as name, abbreviation, telephone number, key word and so on; and the business objects may be put in order according their similarities. A business object with highest similarity may be selected as the matched business object.

Step S200 may include obtaining the user data. The user data may include the position data, the interactive history between the user and the merchant, input history of the user, the user's personal information, and information being currently input by the user and so on. Further, the user data may also be combined with system parameters. For example, the user data may include current system language and current system time and the like.

Obtaining the position data may include obtaining the user's current position data or the position data of object merchant to whom the user is calling.

In some embodiments, processor device 110 may obtain GPS data by html5 technology. For example, processor device 110 can obtain the longitude and latitude of the position of the user by using a function getCurrentPosition ( ). In some embodiments, such position data may also be WIFI data. For example, as for Android devices, processor device 110 may obtain the geographical position obtained in the last positioning operation by the function getLastLocation ( ); or, processor device 110 may also obtain WiFi mac address according to corresponding WiFi's hot spot name, signal strength and the like, so as to obtain the data about the user's current position. In some embodiments, for a communication terminal equipment suitable for Android system, processor device 110 may first obtain Mobile Country Code (MCC), Mobile network number (MNC), Location Area Code (LAC), Cell ID (CID) data by means of TelephonyManager, and further obtains the current position data according to Google API or Baidu API. In some embodiments, processor device 110 may analyze xml of address information fed back by the user so as to obtain country, province (municipality or municipality directly under the Central Government), city (county), operator in Json format, and thus obtains the current position data.

Figure 28:
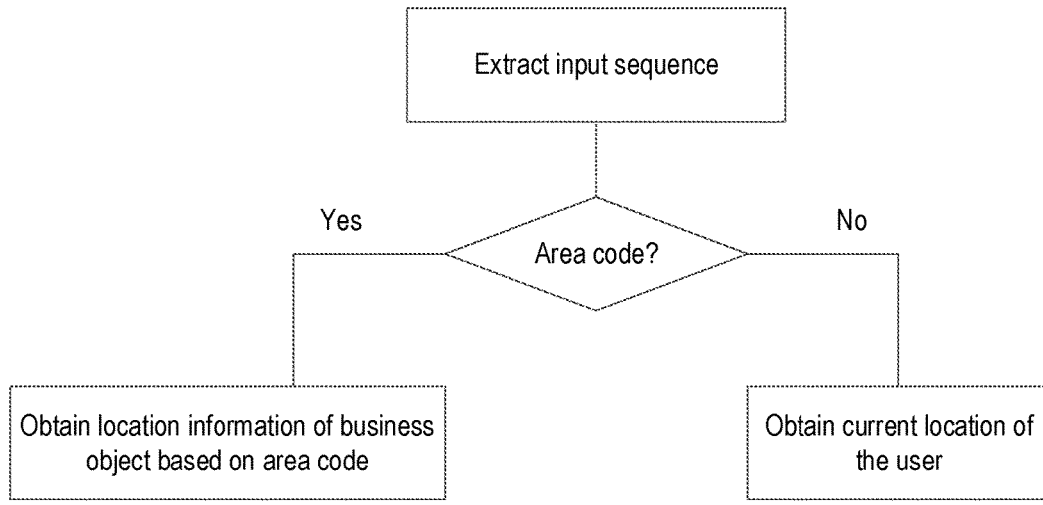
FIG. 28 is a flow chart of an exemplary method for obtaining position data, according to some embodiments of the present disclosure.

In some embodiments, obtaining the position data may include analyzing the input sequence of the user so as to obtain the position data. For example, an area code may be obtained from the input sequence, and corresponding menu items are obtained according to the area code. With reference to FIG. 28, processor device 110 first extracts the input sequence of the user, and detects whether or not it contains an area code. For example, a predetermined number of first digits of the input sequence may be picked out. Then, processor device 110 analyses these digits as being picked out. For example, the predetermined number of digit may be searched in an area code-district lookup table; when no result is found with respect to such digits, it is considered that the input sequence does not contain an area code; when the input sequence contains an area code, processor device 110 inquires in light of the area code, in order to obtain the name of corresponding administrative area. When the input sequence does not contain an area code, processor device 110 obtains the current position data of the user.

Step S200 may also include detection of whether or not the intelligent service interactive platform of the selected matched business object is initiated. In some embodiments, step S200 may include: obtaining the user data, when it is detected that the service for intelligent service interactive platform of the matched business object is initiated. Wherein, the determination about whether or not the intelligent service interactive platform of the selected matched business object is initiated may be performed by the following ways: detecting whether there is touch or press or other operation on the designated platform start button, for example detecting whether a predetermined voice instruction or gesture instruction appears, or setting a predetermined time threshold and detecting whether or not the waiting time during which the user makes no further operation after selecting the matched business object exceeds the predetermined time threshold.

Step S300 may further include displaying the platform menus in the designated display mode to the user. Displaying the platform menus in the designated display mode includes displaying the platform menus in different display modes, or according to predetermined display timing or a predetermined display level or a predetermined style or a predetermined layout.

Figure 29:
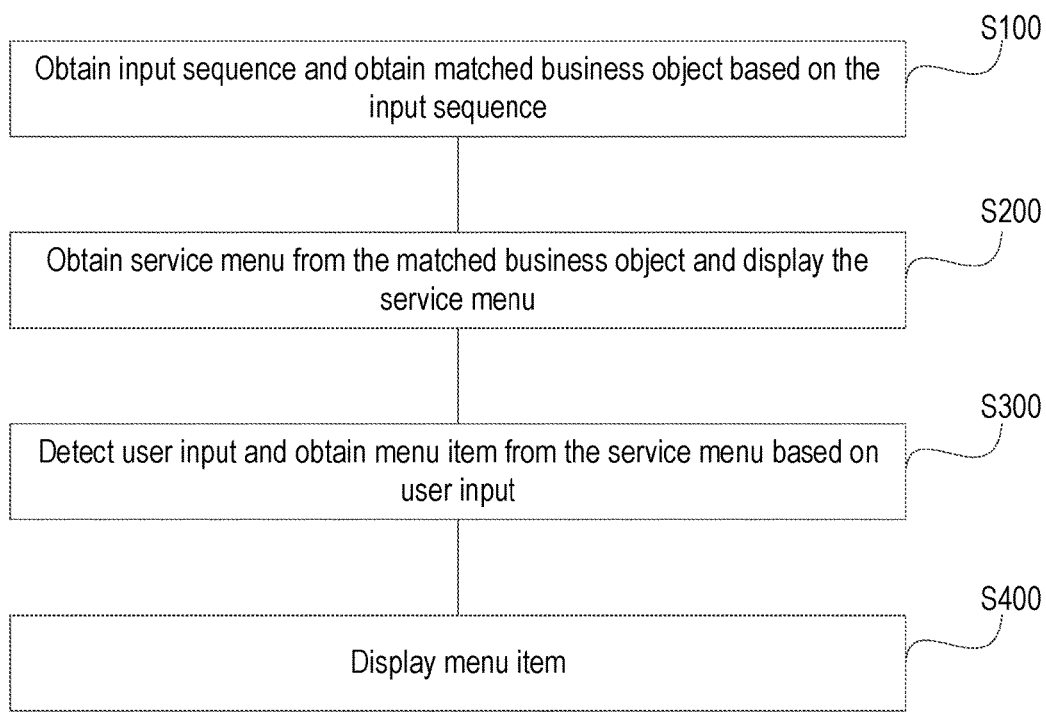
FIG. 29 is a flow chart of another exemplary method for implementing an intelligent service interactive platform, according to some embodiments of the present disclosure.

With reference to FIG. 29, another embodiment of the method for implementing an intelligent service interactive platform may include: a step T100, for obtaining the user the input sequence, and obtaining the matched business object according to the input sequence; a step T200, for obtaining the platform menus of the matched business object and displaying the main interface of the platform menus of the matched business object to the user; a step T300, for detecting the user's inputs, and obtaining the platform menu items suitable for the user's inputs, among the matched business object, according to the user's input signals and the user data; a step T400, for further displaying the platform menu items suitable for the user's inputs to the user.

Figure 30:
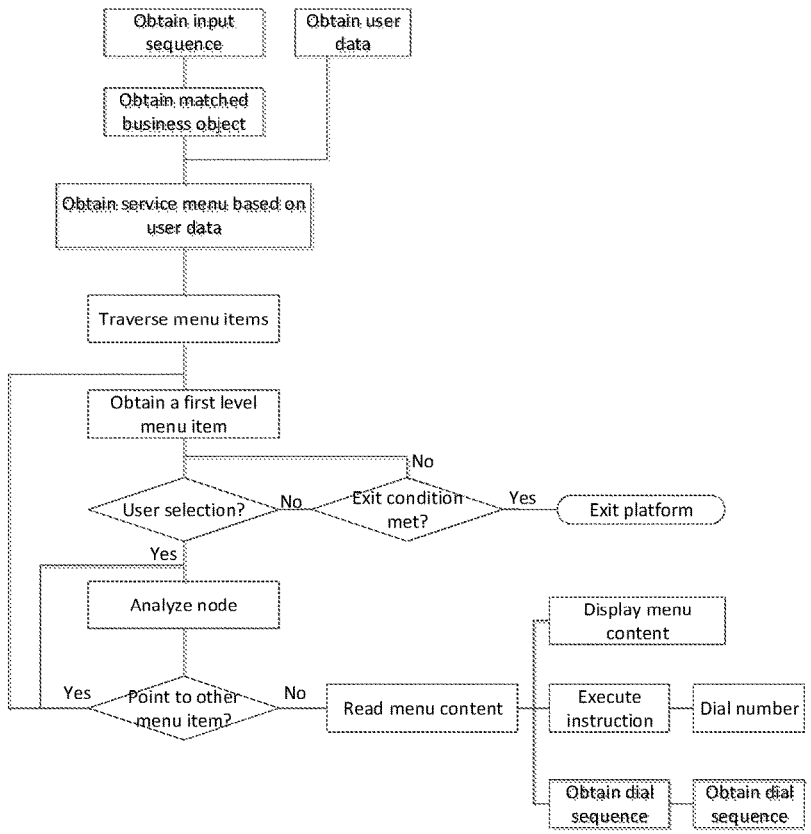
FIG. 30 is a flow chart of yet another exemplary method for implementing an intelligent service interactive platform, according to some embodiments of the present disclosure.

With reference to FIG. 30, according to some embodiments of the method for implementing an intelligent service interactive platform of the invention, when the user inputs through the input device 130, the input device 130 obtains the input signal and delivers it to processor device 110. Processor device 110 obtains an input sequence according to the input signal, and further obtains the user data. Then, processor device 110 searches in the storage device 120, so as to obtain some menu items of the intelligent service interactive platform of business object, which are matched the input sequence and correspond to the user data. Searches may be made according to the input sequence, so as to obtain a business object that is matched with the input sequence; and then, the intelligent service interactive platform menus of the business object is filtered according to the user data, so as to obtain the platform menu items that contain the user data or are suitable for the user data. Further, it may also include detecting whether or not the intelligent service interactive platform of the selected matched business object is initiated; and obtaining the user data, when it is detected that the service for intelligent service interactive platform of the matched business object is initiated.

Processor device 110 may read out the storage device 120 these platform menu items that are matched with the input sequence and correspond to the user data; or, processor device 110 may download these platform menu item from the storage device 120 to locate device via communication interface apparatus, and analyzes those platform menu item. Processor device 110 may traverse all the platform menu items, acquire the display levels of these platform menu items, and further extract the platform menu items in the first display level. Processor device 110 may display these platform menu items via the main interface.

Input device 130 may detect whether or not the user inputs on the current display interface. When the user does not select any current the menu item, whether or not the conditions of withdrawing the platform are satisfied is further determined. For example, if the user clicks a withdraw key, or the user make a withdraw-indicating gesture, or the input device 130 receives other withdraw-indicating input signals of the user, or the time period during which the user does not make operation exceeds a threshold, it is considered that the condition for exiting the intelligent service interactive platform is satisfied, and processor device 110 performs a withdrawing operation. When the user selects a current menu item, the input device 130 delivers the input signal of the user to processor device 110. Processor device 110 obtains the menu item node selected by the user according to the input signal of the user, and analyzes the menu item.

The analysis of processing device 110 on the menu item selected by the user may further include determining whether or not the menu item selected by the user has related nodes, or whether or not the menu item points to other menus. When the menu item has next level menu, its next level menu is obtained and displayed. When the menu item points to its previous level menu or main menu, processor device 110 obtains the pointed menu, and jumps to its previous level menu or main menu. When the menu item does not have related nodes or does not point to other menus, the menu contents of the menu item is read out, and corresponding operation is executed.

In some embodiments, the menu contents of the menu item may include a data file, for expressing data contents such as designated web pages or texts or pictures. In some embodiments, the menu contents of the menu item may also include instructions such as dialing instructions or inputting instructions. When the menu contents include a dialing instruction, the menu contents may also include a preset number sequence, so that when processor device 110 read such dialing instruction, it can obtain the preset number sequence, and dials preset number sequence. In some embodiments, the menu contents of the menu item may also include an instruction of acquiring a dialing sequence and a dialing instruction. Processor device 110 further read the node route corresponding to the menu item, obtains a key sequence of all the nodes in the access route from the root node to the menu item node. Processor device 110 obtains a dialing sequence based on the key sequence; for example, processor device 110 may use the number sequence as a dialing sequence, or may use the combination of the number corresponding to the business object and the key sequence as a dialing sequence, or may find a dialing sequence corresponding to the number sequence by looking up a table. For example, as for China Mobile, an obtained key sequence is 3-1-1, then the dialing sequence obtained by looking up a table and corresponding to China Mobile is 10086-3-1-1. After obtaining the corresponding dialing sequence, processor device 110 further executes the dialing instruction, and dials the obtained dialing sequence. In some embodiments, the menu contents of the menu item may also include an input instruction, for prompting the user to input; for example, an input box may be displayed to prompt the user to input in the input box. The input signal may be further detected by input device 130, and the input information of the user may be obtained according to the input signal. Processor device 110 may execute the input instruction, and perform operations on the obtained input information, for example storing the input information such as the interactive history, the user account, input history and so on, into the data field where the user corresponds to the business object. Furthermore, processor device 110 may also inquire according to the input information, returns inquiry results, and displays the inquiry results to the user.

Figure 31:
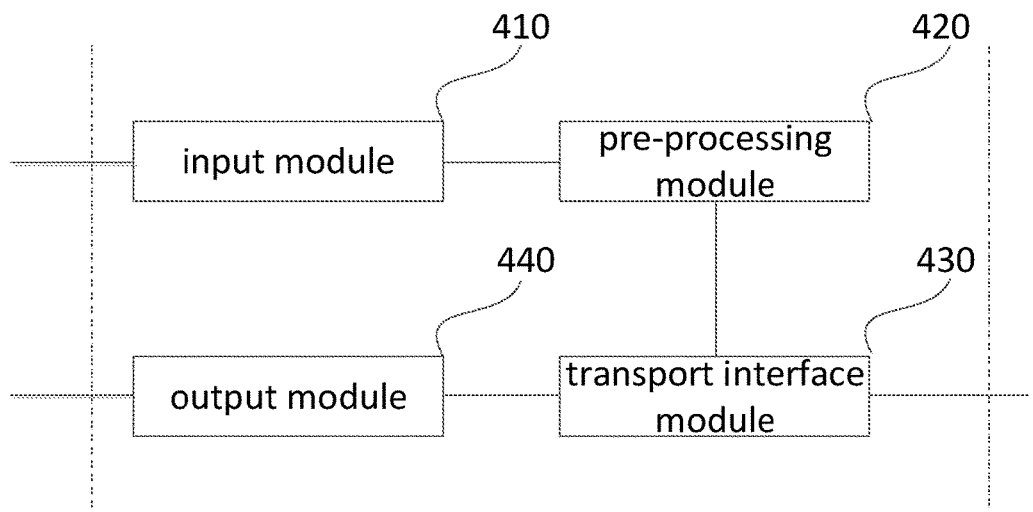
FIG. 31 is a schematic diagram of an exemplary information interactive platform device, according to some embodiments of the present disclosure.

According to some embodiments of the present disclosure, FIG. 31 is a schematic diagram of an exemplary information interactive platform device 400. The information interactive platform device 400 may include: input module 410, used to receive an input from a user and the input is associated with at least a business object, wherein said business object may include information interactive platform; a pre-processing module 420, used to obtain user data; a transport interface module 430, used to transport user data obtained from pre-processing module 420 and as well as menu items corresponding to user data from pre-processing module 420 and matched with input data from input module 410; output module 440, used to display said menu items obtained from transport interface module 430.

Figure 32:
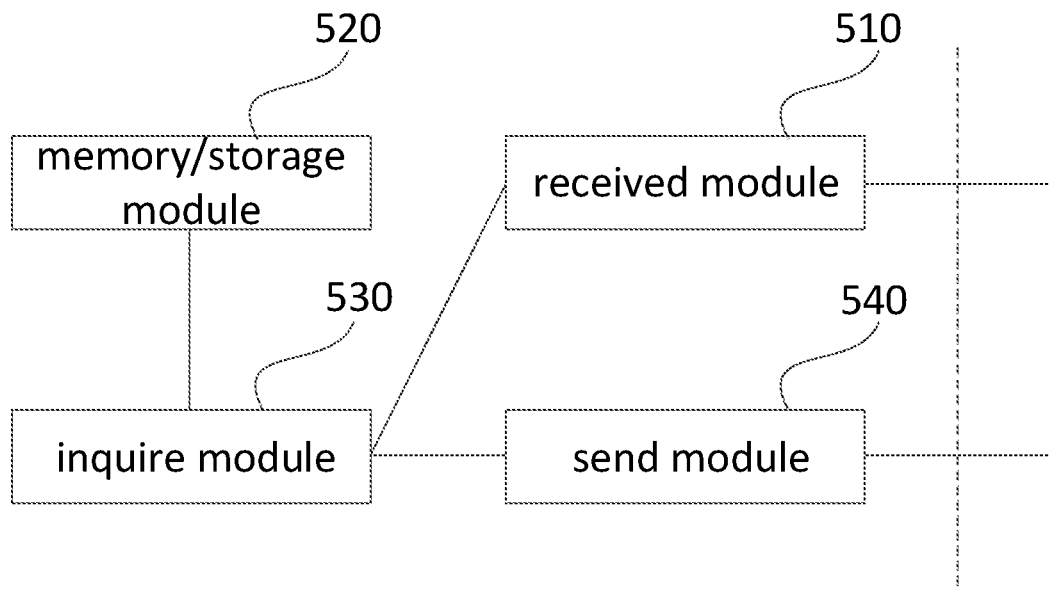
FIG. 32 is a schematic diagram of another exemplary information interactive platform device, according to some embodiments of the present disclosure.

According to some embodiments of the present disclosure, FIG. 32 is a schematic diagram of another exemplary information interactive platform device 500. The information interactive platform device 500 may include: received module 510, used to receive input information and user data; memory/storage module 520, used to store business objects and the corresponding information interactive platform thereof, wherein said business object may include one or more data fields for inquiring according to input information; inquire module 530, used to search in said menu items of memory/storage module 520 and obtain a menu item matched with said input information and corresponding to said user data; send module 540, used to send the menu item from inquire module 530.

Specifically, the menu items may be stored in a form of linked objects in the memory/storage module 520. For example, according to the voice visualization result of each menu item in the voice menu, each menu item is treated as one linked object, wherein each linked object includes one or more different the data field, such as displayed text, menu content, parent node, related nodes, menu type, priority, and so on; and linked object group including one or more menu item may form a menu.

In other embodiments, the menu items may be stored in a tree-type data structure in the memory/storage module 520. For example, each menu item node in the tree-type data structure may include a displayed content data field and a menu content data field. The displayed content data field may store data such as the icon for indicating the menu item. The menu content data field may store description of the content of the menu item, such as links, texts, pictures, data, pointers, computational formulas and the like, or operational instructions. Depending on the type of the menu content data field, the menu item nodes in the tree-type data structure may include indication node, the menu content data field of which may include a pointer pointing to one or more specific nodes, and content node, the menu content data field of which may include data file or operational instructions.

In an embodiment, memory/storage module 520 may co-located at the same side with received module 510, inquire module 530 and send module 540, achieving an inquiry of the menu items through a local data transport.

Figure 33:
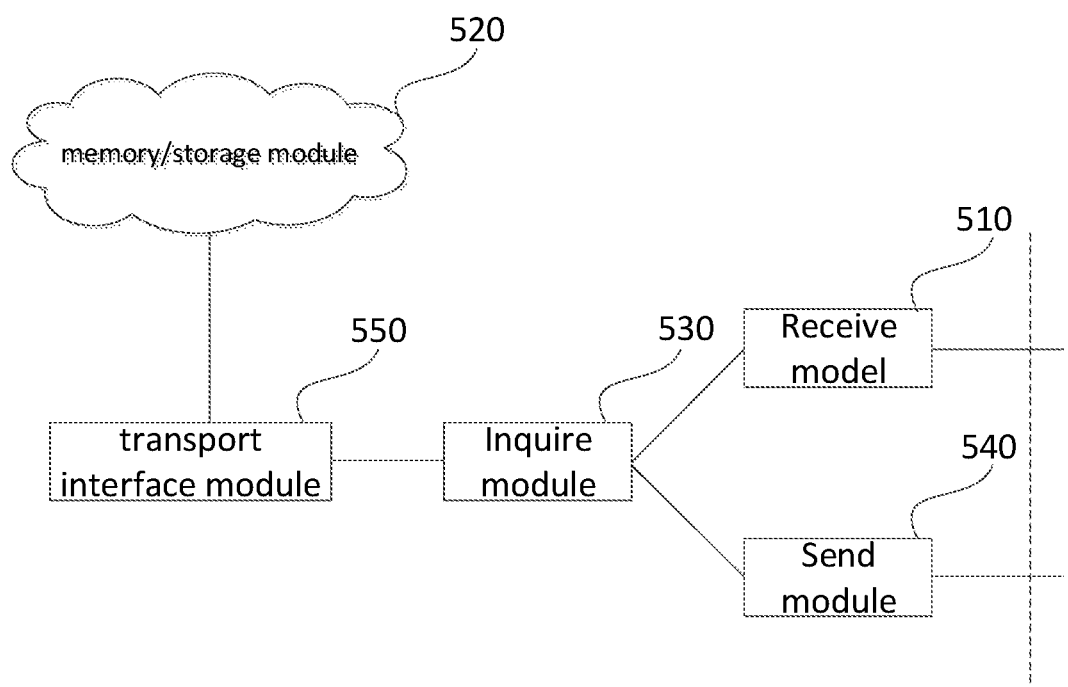
FIG. 33 is a schematic diagram of another exemplary information interactive platform device, according to some embodiments of the present disclosure.

In another embodiment, memory/storage module 520 may located at a different side of the network to received module 510, inquire module 530 and send module 540. Referred in FIG. 33, information interactive platform device 500 may further include: transport module 550, used to send an inquiry request from inquire module 530 to memory/storage module 520, and feed an inquiry result back to inquire module 530. The inquiry request may at least include input information and user data, and the data field name of said information interactive platform menu.

Compare to the prior arts, the present disclosure makes full use of user data during the process of finding a matched business object, and/or filtering platform menu items, and/or displaying the obtained platform menu items to the user, so as to provider a more accurate menu item to the user, while setting up an intelligent information interactive platform between users and business objects.

The specification has described systems and methods for implementing information interaction in a smart service platform. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer-implemented information service platform interaction method, comprising:
   obtaining, through a user interface of a mobile device, an input sequence from a user;
   determining, by a processor device, at least one business object based on the input sequence, wherein the input sequence at least partially matches an identifier of the at least one business object;
   obtaining user data based on the at least one business object or based on user identification information;
   determining, by the processor device, a menu item of an information service platform provided by the at least one business object based on the user data; and
   displaying the menu item according to a designated display mode on a display of the mobile device, wherein, said displaying the menu item according to a designated display mode includes marking or reordering the menu item by upgrading a display level of a first menu item with a higher priority to a higher level,
   wherein the method further comprises:
   detecting that the menu item has a related node;
   when the related node exists, obtaining the display level of its related node and determining whether the display level of its related node is below that of the menu item;
      when the display level of its related node is below that of the menu item, traversing, via the processor device, its lower level menu items, and forming a lower level menu;
      when the display level of its related node is above that of the menu item, jumping to, via the processor device, its related nodes and displaying corresponding menu items.

2. The method of claim 1, wherein further comprises:
   obtaining the current position data of the user or the position data of business object to whom the user is calling currently;
   filtering the platform menu items of the business object, so as to obtain a menu item corresponding to the position data.

3. The method of claim 2, wherein said filtering the platform menu items of the business object further comprises: selecting the menu item with geographical location information which is nearest to the current position data.

4. The method of claim 1, wherein further comprises: filtering menu items according to a history of interaction with the at least one business object.

5. The method of claim 1, wherein further comprises: filtering menu items according to a history of interaction with the at least one business object.

6. The method of claim 5, wherein further comprises: obtaining said history of interaction with the at least one business object according to an account information associated with the at least one business object.

7. The method of claim 1, wherein further comprises: filtering menu items of the menu according to personal information or an input history or a further input, wherein said input history include the input content input for a set times or those ranked in the top predetermined number according to the number of repetition in a predetermined time period.

8. The method of claim 1, wherein further comprises: transforming a voice menu provided by the at least one business object into a visible menu to be displayed in a current system language.

9. The method of claim 1, wherein further comprises:
   obtaining a current system language transforming a voice menu provided by the at least one business object into a visible menu to be displayed in the current system language; or
   obtain a current system time and determining a menu item corresponding to the current system time by comparing the current system time to the time-indicating data field of the menu item.

10. The method of claim 1, wherein further comprises:
    obtaining feedback menu item and the problem, according to the input feedback information;
    marking or modifying the menu items in question accordingly.

11. An information service platform interaction system, wherein comprising: a processor device operatively coupled to a memory device, wherein the processor device is configured to execute instructions stored in the memory device to perform operations comprising:

obtaining, through a user interface of a mobile device, an input sequence from a user;
determining at least one business object based on the input sequence, wherein the input sequence at least partially matches an identifier of the at least one business object;
obtaining user data based on the at least one business object or based on user identification information;
determining a menu of an information service platform provided by the at least one business object based on the user data;
displaying the menu according to a designated display mode on a display of the mobile device;
wherein said displaying the menu item according to a designated display mode includes marking or reordering the menu item by upgrading a display level of a first menu item with a higher priority to a higher level
wherein further comprises:
detecting that the menu item has a related node;
when the related node exists, obtaining the display level of its related node and determining whether the display level of its related node is below that of the menu item;
when the display level of its related node is below that of the menu item, traversing, via the processor device, its lower level menu items, and forming a lower level menu;
when the display level of its related node is above that of the menu item, jumping to, via the processor device, its related nodes and displaying corresponding menu items.

12. The system of claim 11, wherein further comprises:
obtaining the current position data of the user or the position data of business object to whom the user is calling currently;
filtering the platform menu items of the business object, so as to obtain a menu item corresponding to the position data.

13. The system of claim 12, wherein said filtering the platform menu items of the business object further comprises: selecting the menu item with geographical location information which is nearest to the current position data.

14. The system of claim 11, wherein further comprises: filtering menu items according to a history of interaction with the at least one business object.

15. The system of claim 11, wherein further comprises: filtering menu items according to a history of interaction with the at least one business object.

16. The system of claim 15, wherein further comprises: obtaining said history of interaction with the at least one business object according to an account information associated with the at least one business object.

17. The system of claim 11, wherein further comprises: filtering menu items of the menu according to personal information or an input history or a further input, wherein said input history include the input content input for a set times or those ranked in the top predetermined number according to the number of repetition in a predetermined time period.

18. The system of claim 11, wherein further comprises: transforming a voice menu provided by the at least one business object into a visible menu to be displayed in a current system language.

19. The system of claim 11, wherein further comprises:
obtaining a current system language transforming a voice menu provided by the at least one business object into a visible menu to be displayed in the current system language; or
obtain a current system time and determining a menu item corresponding to the current system time by comparing the current system time to the time-indicating data field of the menu item.

20. The system of claim 11, wherein further comprises:
obtaining feedback menu item and the problem, according to the input feedback information;
marking or modifying the menu items in question accordingly.

* * * * *